United States Patent
Hazani et al.

(10) Patent No.: US 9,621,293 B2
(45) Date of Patent: Apr. 11, 2017

(54) DISTRIBUTION OF TIME-DIVISION MULTIPLEXED (TDM) MANAGEMENT SERVICES IN A DISTRIBUTED ANTENNA SYSTEM, AND RELATED COMPONENTS, SYSTEMS, AND METHODS

(71) Applicant: CORNING OPTICAL COMMUNICATIONS WIRELESS LTD, Airport City (IL)

(72) Inventors: Ami Hazani, Ra'anana (IL); Ofer Nisan, Netanya (IL)

(73) Assignee: Corning Optical Communications Wireless Ltd, Airport (IL)

( * ) Notice: Subject to any disclaimer, the term of this patent is extended or adjusted under 35 U.S.C. 154(b) by 64 days.

(21) Appl. No.: 14/599,710

(22) Filed: Jan. 19, 2015

(65) Prior Publication Data
US 2015/0131632 A1  May 14, 2015

Related U.S. Application Data

(63) Continuation of application No. PCT/IL2013/050671, filed on Aug. 7, 2013.
(Continued)

(51) Int. Cl.
*H04J 3/00* (2006.01)
*H04J 3/16* (2006.01)
(Continued)

(52) U.S. Cl.
CPC .............. *H04J 3/1694* (2013.01); *H04B 7/04* (2013.01); *H04W 72/042* (2013.01);
(Continued)

(58) Field of Classification Search
CPC .... H04J 3/1694; H04B 7/04; H04W 72/0413; H04W 72/042; H04W 74/04; H04W 88/085; H04W 92/12

See application file for complete search history.

(56) References Cited

U.S. PATENT DOCUMENTS 4,365,865 A  12/1982  Stiles
4,449,246 A  5/1984  Seiler et al.
(Continued)

FOREIGN PATENT DOCUMENTS

AU  645192 B  10/1992
AU  731180 B2  3/1998
(Continued)

OTHER PUBLICATIONS

Seto et al., "Optical Subcarrier Multiplexing Transmission for Base Station With Adaptive Array Antenna," IEEE Transactions on Microwave Theory and Techniques, vol. 49, No. 10, Oct. 2001, pp. 2036-2041.
(Continued)

*Primary Examiner* — Abdelnabi O Musa
(74) *Attorney, Agent, or Firm* — C. Keith Montgomery

(57) ABSTRACT

Distribution of management services in distributed antenna systems having a central unit and remote units configured to time-division multiplex (TDM) downlink and/or uplink management signals into time slots to form a TDM management frame signal. In this manner, collision will not occur between multiple management signals communicated over a common communications medium at the same time in the distributed antenna system. Collision detection and management mechanism can add design complexity, cost by requiring additional components, and require additional area on electronic boards. The TDM management frame signal may also be modulated at a carrier frequency before being combined with RF communications signals so that the combined signals are within a linear range of shared certain communications components to reduce cost and area.

18 Claims, 7 Drawing Sheets

Related U.S. Application Data

(60) Provisional application No. 61/680,421, filed on Aug. 7, 2012.

(51) Int. Cl.
*H04W 74/04* (2009.01)
*H04B 7/04* (2017.01)
*H04W 72/04* (2009.01)
*H04W 88/08* (2009.01)
*H04W 92/12* (2009.01)

(52) U.S. Cl.
CPC ....... *H04W 72/0413* (2013.01); *H04W 74/04* (2013.01); *H04W 88/085* (2013.01); *H04W 92/12* (2013.01)

(56) References Cited

U.S. PATENT DOCUMENTS

| | | | |
|---|---|---|---|
| 4,573,212 A | 2/1986 | Lipsky | |
| 4,665,560 A | 5/1987 | Lange | |
| 4,867,527 A | 9/1989 | Dotti et al. | |
| 4,889,977 A | 12/1989 | Haydon | |
| 4,896,939 A | 1/1990 | O'Brien | |
| 4,916,460 A | 4/1990 | Powell | |
| 4,939,852 A | 7/1990 | Brenner | |
| 4,972,346 A | 11/1990 | Kawano et al. | |
| 5,039,195 A | 8/1991 | Jenkins et al. | |
| 5,042,086 A | 8/1991 | Cole et al. | |
| 5,056,109 A | 10/1991 | Gilhousen et al. | |
| 5,059,927 A | 10/1991 | Cohen | |
| 5,125,060 A | 6/1992 | Edmundson | |
| 5,187,803 A | 2/1993 | Sohner et al. | |
| 5,189,718 A | 2/1993 | Barrett et al. | |
| 5,189,719 A | 2/1993 | Coleman et al. | |
| 5,206,655 A | 4/1993 | Caille et al. | |
| 5,208,812 A | 5/1993 | Dudek et al. | |
| 5,210,812 A | 5/1993 | Nilsson et al. | |
| 5,260,957 A | 11/1993 | Hakimi | |
| 5,263,108 A | 11/1993 | Kurokawa et al. | |
| 5,267,122 A | 11/1993 | Glover et al. | |
| 5,268,971 A | 12/1993 | Nilsson et al. | |
| 5,278,690 A | 1/1994 | Vella-Coleiro | |
| 5,278,989 A | 1/1994 | Burke et al. | |
| 5,280,472 A | 1/1994 | Gilhousen et al. | |
| 5,299,947 A | 4/1994 | Barnard | |
| 5,301,056 A | 4/1994 | O'Neill | |
| 5,325,223 A | 6/1994 | Bears | |
| 5,339,058 A | 8/1994 | Lique | |
| 5,339,184 A | 8/1994 | Tang | 359/124 |
| 5,343,320 A | 8/1994 | Anderson | |
| 5,377,035 A | 12/1994 | Wang et al. | |
| 5,379,455 A | 1/1995 | Koschek | |
| 5,381,459 A | 1/1995 | Lappington | |
| 5,396,224 A | 3/1995 | Dukes et al. | |
| 5,400,391 A | 3/1995 | Emura et al. | |
| 5,420,863 A | 5/1995 | Taketsugu et al. | |
| 5,424,864 A | 6/1995 | Emura | |
| 5,444,564 A | 8/1995 | Newberg | |
| 5,457,557 A | 10/1995 | Zarem et al. | |
| 5,459,727 A | 10/1995 | Vannucci | |
| 5,469,523 A | 11/1995 | Blew et al. | |
| 5,519,830 A | 5/1996 | Opoczynski | |
| 5,543,000 A | 8/1996 | Lique | |
| 5,546,443 A | 8/1996 | Raith | |
| 5,557,698 A | 9/1996 | Gareis et al. | |
| 5,574,815 A | 11/1996 | Kneeland | |
| 5,598,288 A | 1/1997 | Collar | |
| 5,606,725 A | 2/1997 | Hart | |
| 5,615,034 A | 3/1997 | Hori | |
| 5,627,879 A | 5/1997 | Russell et al. | |
| 5,640,678 A | 6/1997 | Ishikawa et al. | |
| 5,642,405 A | 6/1997 | Fischer et al. | |
| 5,644,622 A | 7/1997 | Russell et al. | |
| 5,648,961 A | 7/1997 | Ebihara | |
| 5,651,081 A | 7/1997 | Blew et al. | |
| 5,657,374 A | 8/1997 | Russell et al. | |
| 5,668,562 A | 9/1997 | Cutrer et al. | |
| 5,677,974 A | 10/1997 | Elms et al. | |
| 5,682,256 A | 10/1997 | Motley et al. | |
| 5,694,232 A | 12/1997 | Parsay et al. | |
| 5,703,602 A | 12/1997 | Casebolt | |
| 5,708,681 A | 1/1998 | Malkemes et al. | |
| 5,726,984 A | 3/1998 | Kubler et al. | |
| 5,765,099 A | 6/1998 | Georges et al. | |
| 5,790,536 A | 8/1998 | Mahany et al. | |
| 5,790,606 A | 8/1998 | Dent | |
| 5,793,772 A | 8/1998 | Burke et al. | |
| 5,802,173 A | 9/1998 | Hamilton-Piercy et al. | |
| 5,802,473 A | 9/1998 | Rutledge et al. | |
| 5,805,975 A | 9/1998 | Green, Sr. et al. | |
| 5,805,983 A | 9/1998 | Naidu et al. | |
| 5,809,395 A | 9/1998 | Hamilton-Piercy et al. | |
| 5,809,431 A | 9/1998 | Bustamante et al. | |
| 5,812,296 A | 9/1998 | Tarusawa et al. | |
| 5,818,619 A | 10/1998 | Medved et al. | |
| 5,818,883 A | 10/1998 | Smith et al. | |
| 5,821,510 A | 10/1998 | Cohen et al. | |
| 5,825,651 A | 10/1998 | Gupta et al. | |
| 5,838,474 A | 11/1998 | Stilling | |
| 5,839,052 A | 11/1998 | Dean et al. | |
| 5,852,651 A | 12/1998 | Fischer et al. | |
| 5,854,986 A | 12/1998 | Dorren et al. | |
| 5,859,719 A | 1/1999 | Dentai et al. | |
| 5,862,460 A | 1/1999 | Rich | |
| 5,867,485 A * | 2/1999 | Chambers | H04B 10/25753 370/281 |
| 5,867,763 A | 2/1999 | Dean et al. | |
| 5,881,200 A | 3/1999 | Burt | |
| 5,883,882 A | 3/1999 | Schwartz | |
| 5,896,568 A | 4/1999 | Tseng et al. | |
| 5,903,834 A | 5/1999 | Wallstedt et al. | |
| 5,910,776 A | 6/1999 | Black | |
| 5,913,003 A | 6/1999 | Arroyo et al. | |
| 5,917,636 A | 6/1999 | Wake et al. | |
| 5,930,682 A | 7/1999 | Schwartz et al. | |
| 5,936,754 A | 8/1999 | Ariyavisitakul et al. | |
| 5,943,372 A | 8/1999 | Gans et al. | |
| 5,946,622 A | 8/1999 | Bojeryd | |
| 5,949,564 A | 9/1999 | Wake | |
| 5,953,670 A | 9/1999 | Newson | |
| 5,959,531 A | 9/1999 | Gallagher, III et al. | |
| 5,960,344 A | 9/1999 | Mahany | |
| 5,969,837 A | 10/1999 | Farber et al. | |
| 5,983,070 A | 11/1999 | Georges et al. | |
| 5,987,303 A | 11/1999 | Dutta et al. | |
| 6,005,884 A | 12/1999 | Cook et al. | |
| 6,006,069 A | 12/1999 | Langston et al. | |
| 6,006,105 A | 12/1999 | Rostoker et al. | |
| 6,011,980 A | 1/2000 | Nagano et al. | |
| 6,014,546 A | 1/2000 | Georges et al. | |
| 6,016,426 A | 1/2000 | Bodell | |
| 6,023,625 A | 2/2000 | Myers, Jr. | |
| 6,037,898 A | 3/2000 | Parish et al. | |
| 6,061,161 A | 5/2000 | Yang et al. | |
| 6,069,721 A | 5/2000 | Oh et al. | |
| 6,088,381 A | 7/2000 | Myers, Jr. | |
| 6,118,767 A | 9/2000 | Shen et al. | |
| 6,122,529 A | 9/2000 | Sabat, Jr. et al. | |
| 6,127,917 A | 10/2000 | Tuttle | |
| 6,128,470 A | 10/2000 | Naidu et al. | |
| 6,128,477 A | 10/2000 | Freed | |
| 6,148,041 A | 11/2000 | Dent | |
| 6,150,921 A | 11/2000 | Werb et al. | |
| 6,157,810 A | 12/2000 | Georges et al. | |
| 6,192,216 B1 | 2/2001 | Sabat, Jr. et al. | |
| 6,194,968 B1 | 2/2001 | Winslow | |
| 6,212,397 B1 | 4/2001 | Langston et al. | |
| 6,222,503 B1 | 4/2001 | Gietema | |
| 6,223,201 B1 | 4/2001 | Reznak | |
| 6,232,870 B1 | 5/2001 | Garber et al. | |
| 6,236,789 B1 | 5/2001 | Fitz | |
| 6,236,863 B1 | 5/2001 | Waldroup et al. | |
| 6,240,274 B1 | 5/2001 | Izadpanah | |

(56) References Cited

U.S. PATENT DOCUMENTS

| | | |
|---|---|---|
| 6,246,500 B1 | 6/2001 | Ackerman |
| 6,268,946 B1 | 7/2001 | Larkin et al. |
| 6,275,990 B1 | 8/2001 | Dapper et al. |
| 6,279,158 B1 | 8/2001 | Geile et al. |
| 6,286,163 B1 | 9/2001 | Trimble |
| 6,292,673 B1 | 9/2001 | Maeda et al. |
| 6,295,451 B1 | 9/2001 | Mimura |
| 6,301,240 B1 | 10/2001 | Slabinski et al. |
| 6,307,869 B1 | 10/2001 | Pawelski |
| 6,314,163 B1 | 11/2001 | Acampora |
| 6,317,599 B1 | 11/2001 | Rappaport et al. |
| 6,323,980 B1 | 11/2001 | Bloom |
| 6,324,391 B1 | 11/2001 | Bodell |
| 6,330,241 B1 | 12/2001 | Fort |
| 6,330,244 B1 | 12/2001 | Swartz et al. |
| 6,334,219 B1 | 12/2001 | Hill et al. |
| 6,336,021 B1 | 1/2002 | Nukada |
| 6,336,042 B1 | 1/2002 | Dawson et al. |
| 6,337,754 B1 | 1/2002 | Imajo |
| 6,340,932 B1 | 1/2002 | Rodgers et al. |
| 6,353,406 B1 | 3/2002 | Lanzl et al. |
| 6,353,600 B1 | 3/2002 | Schwartz et al. |
| 6,359,714 B1 | 3/2002 | Imajo |
| 6,370,203 B1 | 4/2002 | Boesch et al. |
| 6,374,078 B1 | 4/2002 | Williams et al. |
| 6,374,124 B1 | 4/2002 | Slabinski |
| 6,389,010 B1 | 5/2002 | Kubler et al. |
| 6,400,318 B1 | 6/2002 | Kasami et al. |
| 6,400,418 B1 | 6/2002 | Wakabayashi |
| 6,404,775 B1 | 6/2002 | Leslie et al. |
| 6,405,018 B1 | 6/2002 | Reudink et al. |
| 6,405,058 B2 | 6/2002 | Bobier |
| 6,405,308 B1 | 6/2002 | Gupta et al. |
| 6,414,624 B2 | 7/2002 | Endo et al. |
| 6,415,132 B1 | 7/2002 | Sabat, Jr. |
| 6,421,327 B1 | 7/2002 | Lundby et al. |
| 6,438,301 B1 | 8/2002 | Johnson et al. |
| 6,438,371 B1 | 8/2002 | Fujise et al. |
| 6,448,558 B1 | 9/2002 | Greene |
| 6,452,915 B1 | 9/2002 | Jorgensen |
| 6,459,519 B1 | 10/2002 | Sasai et al. |
| 6,459,989 B1 | 10/2002 | Kirkpatrick et al. |
| 6,477,154 B1 | 11/2002 | Cheong et al. |
| 6,480,702 B1 | 11/2002 | Sabat, Jr. |
| 6,486,907 B1 | 11/2002 | Farber et al. |
| 6,496,290 B1 | 12/2002 | Lee |
| 6,501,965 B1 | 12/2002 | Lucidarme |
| 6,504,636 B1 | 1/2003 | Seto et al. |
| 6,504,831 B1 | 1/2003 | Greenwood et al. |
| 6,512,478 B1 | 1/2003 | Chien |
| 6,519,395 B1 | 2/2003 | Bevan et al. |
| 6,519,449 B1 | 2/2003 | Zhang et al. |
| 6,525,855 B1 | 2/2003 | Westbrook et al. |
| 6,535,330 B1 | 3/2003 | Lelic et al. |
| 6,535,720 B1 | 3/2003 | Kintis et al. |
| 6,549,772 B1 * | 4/2003 | Chavez ............... H04W 88/085 370/328 |
| 6,556,551 B1 | 4/2003 | Schwartz |
| 6,577,794 B1 | 6/2003 | Currie et al. |
| 6,577,801 B2 | 6/2003 | Broderick et al. |
| 6,580,402 B2 | 6/2003 | Navarro et al. |
| 6,580,905 B1 | 6/2003 | Naidu et al. |
| 6,580,918 B1 | 6/2003 | Leickel et al. |
| 6,583,763 B2 | 6/2003 | Judd |
| 6,587,514 B1 | 7/2003 | Wright et al. |
| 6,594,496 B2 | 7/2003 | Schwartz |
| 6,597,325 B2 | 7/2003 | Judd et al. |
| 6,598,009 B2 | 7/2003 | Yang |
| 6,606,430 B2 | 8/2003 | Bartur et al. |
| 6,615,074 B2 | 9/2003 | Mickle et al. |
| 6,628,732 B1 | 9/2003 | Takaki |
| 6,634,811 B1 | 10/2003 | Gertel et al. |
| 6,636,747 B2 | 10/2003 | Harada et al. |
| 6,640,103 B1 | 10/2003 | Inman et al. |
| 6,643,437 B1 | 11/2003 | Park |
| 6,652,158 B2 | 11/2003 | Bartur et al. |
| 6,654,590 B2 | 11/2003 | Boros et al. |
| 6,654,616 B1 | 11/2003 | Pope, Jr. et al. |
| 6,657,535 B1 | 12/2003 | Magbie et al. |
| 6,658,269 B1 | 12/2003 | Golemon et al. |
| 6,665,308 B1 | 12/2003 | Rakib et al. |
| 6,670,930 B2 | 12/2003 | Navarro |
| 6,674,966 B1 | 1/2004 | Koonen |
| 6,675,294 B1 | 1/2004 | Gupta et al. |
| 6,678,509 B2 | 1/2004 | Skarman et al. |
| 6,687,437 B1 | 2/2004 | Starnes et al. |
| 6,690,328 B2 | 2/2004 | Judd |
| 6,701,137 B1 | 3/2004 | Judd et al. |
| 6,704,298 B1 | 3/2004 | Matsumiya et al. |
| 6,704,545 B1 | 3/2004 | Wala |
| 6,710,366 B1 | 3/2004 | Lee et al. |
| 6,714,800 B2 | 3/2004 | Johnson et al. |
| 6,731,880 B2 | 5/2004 | Westbrook et al. |
| 6,745,013 B1 | 6/2004 | Porter et al. |
| 6,758,913 B1 | 7/2004 | Tunney et al. |
| 6,763,226 B1 | 7/2004 | McZeal, Jr. |
| 6,771,862 B2 | 8/2004 | Karnik et al. |
| 6,771,933 B1 | 8/2004 | Eng et al. |
| 6,784,802 B1 | 8/2004 | Stanescu |
| 6,785,558 B1 | 8/2004 | Stratford et al. |
| 6,788,666 B1 | 9/2004 | Linebarger et al. |
| 6,801,767 B1 | 10/2004 | Schwartz et al. |
| 6,807,374 B1 | 10/2004 | Imajo et al. |
| 6,812,824 B1 | 11/2004 | Goldinger et al. |
| 6,812,905 B2 | 11/2004 | Thomas et al. |
| 6,823,174 B1 | 11/2004 | Masenten et al. |
| 6,826,163 B2 | 11/2004 | Mani et al. |
| 6,826,164 B2 | 11/2004 | Mani et al. |
| 6,826,337 B2 | 11/2004 | Linnell |
| 6,836,660 B1 | 12/2004 | Wala |
| 6,836,673 B1 | 12/2004 | Trott |
| 6,842,433 B2 | 1/2005 | West et al. |
| 6,847,856 B1 | 1/2005 | Bohannon |
| 6,850,510 B2 | 2/2005 | Kubler |
| 6,865,390 B2 | 3/2005 | Goss et al. |
| 6,873,823 B2 | 3/2005 | Hasarchi |
| 6,876,056 B2 | 4/2005 | Tilmans et al. |
| 6,879,290 B1 | 4/2005 | Toutain et al. |
| 6,882,311 B2 | 4/2005 | Walker et al. |
| 6,883,710 B2 | 4/2005 | Chung |
| 6,885,344 B2 | 4/2005 | Mohamadi |
| 6,885,846 B1 | 4/2005 | Panasik et al. |
| 6,889,060 B2 | 5/2005 | Fernando et al. |
| 6,909,399 B1 | 6/2005 | Zegelin et al. |
| 6,915,058 B2 | 7/2005 | Pons |
| 6,915,529 B1 | 7/2005 | Suematsu et al. |
| 6,919,858 B2 | 7/2005 | Rofougaran |
| 6,920,330 B2 | 7/2005 | Caronni et al. |
| 6,924,997 B2 | 8/2005 | Chen et al. |
| 6,930,987 B1 | 8/2005 | Fukuda et al. |
| 6,931,183 B2 | 8/2005 | Panak et al. |
| 6,931,659 B1 | 8/2005 | Kinemura |
| 6,933,849 B2 | 8/2005 | Sawyer |
| 6,934,511 B1 | 8/2005 | Lovinggood et al. |
| 6,934,541 B2 | 8/2005 | Miyatani |
| 6,941,112 B2 | 9/2005 | Hasegawa |
| 6,946,989 B2 | 9/2005 | Vavik |
| 6,961,312 B2 | 11/2005 | Kubler et al. |
| 6,963,289 B2 | 11/2005 | Aljadeff et al. |
| 6,963,552 B2 | 11/2005 | Sabat, Jr. et al. |
| 6,965,718 B2 | 11/2005 | Koertel |
| 6,967,347 B2 | 11/2005 | Estes et al. |
| 6,968,107 B2 | 11/2005 | Belardi et al. |
| 6,970,652 B2 | 11/2005 | Zhang et al. |
| 6,973,243 B2 | 12/2005 | Koyasu et al. |
| 6,974,262 B1 | 12/2005 | Rickenbach |
| 6,977,502 B1 | 12/2005 | Hertz |
| 7,002,511 B1 | 2/2006 | Ammar et al. |
| 7,006,465 B2 | 2/2006 | Toshimitsu et al. |
| 7,013,087 B2 | 3/2006 | Suzuki et al. |
| 7,015,826 B1 | 3/2006 | Chan et al. |
| 7,020,473 B2 | 3/2006 | Splett |
| 7,020,488 B1 | 3/2006 | Bleile et al. |
| 7,024,166 B2 | 4/2006 | Wallace |

(56) References Cited

U.S. PATENT DOCUMENTS

| | | | |
|---|---|---|---|
| 7,035,512 B2 | 4/2006 | Van Bijsterveld |
| 7,039,399 B2 | 5/2006 | Fischer |
| 7,043,271 B1 | 5/2006 | Seto et al. |
| 7,047,028 B2 | 5/2006 | Cagenius et al. |
| 7,050,017 B2 | 5/2006 | King et al. |
| 7,053,838 B2 | 5/2006 | Judd |
| 7,054,513 B2 | 5/2006 | Herz et al. |
| 7,069,577 B2 | 6/2006 | Geile et al. |
| 7,072,586 B2 | 7/2006 | Aburakawa et al. |
| 7,082,320 B2 | 7/2006 | Kattukaran et al. |
| 7,084,769 B2 | 8/2006 | Bauer et al. |
| 7,093,985 B2 | 8/2006 | Lord et al. |
| 7,103,119 B2 | 9/2006 | Matsuoka et al. |
| 7,103,377 B2 | 9/2006 | Bauman et al. |
| 7,106,252 B2 | 9/2006 | Smith et al. |
| 7,106,931 B2 | 9/2006 | Sutehall et al. |
| 7,110,795 B2 | 9/2006 | Doi |
| 7,114,859 B1 | 10/2006 | Tuohimaa et al. |
| 7,127,175 B2 | 10/2006 | Mani et al. |
| 7,127,176 B2 | 10/2006 | Sasaki |
| 7,142,503 B1 | 11/2006 | Grant et al. |
| 7,142,535 B2 | 11/2006 | Kubler et al. |
| 7,142,619 B2 | 11/2006 | Sommer et al. |
| 7,146,506 B1 | 12/2006 | Hannah et al. |
| 7,160,032 B2 | 1/2007 | Nagashima et al. |
| 7,171,244 B2 | 1/2007 | Bauman |
| 7,184,728 B2 | 2/2007 | Solum |
| 7,190,748 B2 | 3/2007 | Kim et al. |
| 7,194,023 B2 | 3/2007 | Norrell et al. |
| 7,199,443 B2 | 4/2007 | Elsharawy |
| 7,200,305 B2 | 4/2007 | Dion et al. |
| 7,200,391 B2 | 4/2007 | Chung et al. |
| 7,228,072 B2 | 6/2007 | Mickelsson et al. |
| 7,263,293 B2 | 8/2007 | Ommodt et al. |
| 7,269,311 B2 | 9/2007 | Kim et al. |
| 7,280,011 B2 | 10/2007 | Bayar et al. |
| 7,286,843 B2 | 10/2007 | Scheck |
| 7,286,854 B2 | 10/2007 | Ferrato et al. |
| 7,295,119 B2 | 11/2007 | Rappaport et al. |
| 7,310,430 B1 | 12/2007 | Mallya et al. |
| 7,313,415 B2 | 12/2007 | Wake et al. |
| 7,315,735 B2 | 1/2008 | Graham |
| 7,324,730 B2 | 1/2008 | Varkey et al. |
| 7,343,164 B2 | 3/2008 | Kallstenius |
| 7,348,843 B1 | 3/2008 | Qiu et al. |
| 7,349,633 B2 | 3/2008 | Lee et al. |
| 7,359,408 B2 | 4/2008 | Kim |
| 7,359,674 B2 | 4/2008 | Markki et al. |
| 7,366,150 B2 | 4/2008 | Lee et al. |
| 7,366,151 B2 | 4/2008 | Kubler et al. |
| 7,369,526 B2 | 5/2008 | Lechleider et al. |
| 7,379,669 B2 | 5/2008 | Kim |
| 7,388,892 B2 | 6/2008 | Nishiyama et al. |
| 7,392,025 B2 | 6/2008 | Rooyen et al. |
| 7,392,029 B2 | 6/2008 | Pronkine |
| 7,394,883 B2 | 7/2008 | Funakubo et al. |
| 7,403,156 B2 | 7/2008 | Coppi et al. |
| 7,409,159 B2 | 8/2008 | Izadpanah |
| 7,412,224 B2 | 8/2008 | Kotola et al. |
| 7,424,228 B1 | 9/2008 | Williams et al. |
| 7,444,051 B2 | 10/2008 | Tatat et al. |
| 7,450,853 B2 | 11/2008 | Kim et al. |
| 7,450,854 B2 | 11/2008 | Lee et al. |
| 7,451,365 B2 | 11/2008 | Wang et al. |
| 7,454,222 B2 | 11/2008 | Huang et al. |
| 7,460,507 B2 | 12/2008 | Kubler et al. |
| 7,460,829 B2 | 12/2008 | Utsumi et al. |
| 7,460,831 B2 | 12/2008 | Hasarchi |
| 7,466,925 B2 | 12/2008 | Iannelli |
| 7,469,105 B2 | 12/2008 | Wake et al. |
| 7,477,597 B2 | 1/2009 | Segel |
| 7,483,504 B2 | 1/2009 | Shapira et al. |
| 7,483,711 B2 | 1/2009 | Burchfiel |
| 7,496,070 B2 | 2/2009 | Vesuna |
| 7,496,384 B2 | 2/2009 | Seto et al. |
| 7,505,747 B2 | 3/2009 | Solum |
| 7,512,419 B2 | 3/2009 | Solum |
| 7,522,552 B2 | 4/2009 | Fein et al. |
| 7,539,509 B2 | 5/2009 | Bauman et al. |
| 7,542,452 B2 | 6/2009 | Penumetsa |
| 7,546,138 B2 | 6/2009 | Bauman |
| 7,548,138 B2 | 6/2009 | Kamgaing |
| 7,548,695 B2 | 6/2009 | Wake |
| 7,551,641 B2 | 6/2009 | Pirzada et al. |
| 7,557,758 B2 | 7/2009 | Rofougaran |
| 7,580,384 B2 | 8/2009 | Kubler et al. |
| 7,586,861 B2 | 9/2009 | Kubler et al. |
| 7,590,354 B2 | 9/2009 | Sauer et al. |
| 7,593,704 B2 | 9/2009 | Pinel et al. |
| 7,599,420 B2 | 10/2009 | Forenza et al. |
| 7,599,672 B2 | 10/2009 | Shoji et al. |
| 7,610,046 B2 | 10/2009 | Wala |
| 7,630,690 B2 | 12/2009 | Kaewell, Jr. et al. |
| 7,633,934 B2 | 12/2009 | Kubler et al. |
| 7,639,982 B2 | 12/2009 | Wala |
| 7,646,743 B2 | 1/2010 | Kubler et al. |
| 7,646,777 B2 | 1/2010 | Hicks, III et al. |
| 7,653,397 B2 | 1/2010 | Pernu et al. |
| 7,668,565 B2 | 2/2010 | Ylänen et al. |
| 7,675,936 B2 | 3/2010 | Mizutani et al. |
| 7,688,811 B2 | 3/2010 | Kubler et al. |
| 7,693,486 B2 | 4/2010 | Kasslin et al. |
| 7,697,467 B2 | 4/2010 | Kubler et al. |
| 7,697,574 B2 | 4/2010 | Suematsu et al. |
| 7,715,375 B2 | 5/2010 | Kubler et al. |
| 7,720,510 B2 | 5/2010 | Pescod et al. |
| 7,751,374 B2 | 7/2010 | Donovan |
| 7,751,838 B2 | 7/2010 | Ramesh et al. |
| 7,760,703 B2 | 7/2010 | Kubler et al. |
| 7,761,093 B2 | 7/2010 | Sabat, Jr. et al. |
| 7,768,951 B2 | 8/2010 | Kubler et al. |
| 7,773,573 B2 | 8/2010 | Chung et al. |
| 7,778,603 B2 | 8/2010 | Palin et al. |
| 7,787,823 B2 | 8/2010 | George et al. |
| 7,805,073 B2 | 9/2010 | Sabat, Jr. et al. |
| 7,809,012 B2 | 10/2010 | Ruuska et al. |
| 7,812,766 B2 | 10/2010 | Leblanc et al. |
| 7,812,775 B2 | 10/2010 | Babakhani et al. |
| 7,817,969 B2 | 10/2010 | Castaneda et al. |
| 7,835,328 B2 | 11/2010 | Stephens et al. |
| 7,844,182 B2 | 11/2010 | Mostert et al. ............... 398/83 |
| 7,848,316 B2 | 12/2010 | Kubler et al. |
| 7,848,770 B2 | 12/2010 | Scheinert |
| 7,853,234 B2 | 12/2010 | Afsahi |
| 7,870,321 B2 | 1/2011 | Rofougaran |
| 7,880,677 B2 | 2/2011 | Rofougaran et al. |
| 7,881,755 B1 | 2/2011 | Mishra et al. |
| 7,894,423 B2 | 2/2011 | Kubler et al. |
| 7,899,007 B2 | 3/2011 | Kubler et al. |
| 7,907,972 B2 | 3/2011 | Walton et al. |
| 7,912,043 B2 | 3/2011 | Kubler et al. |
| 7,912,506 B2 | 3/2011 | Lovberg et al. |
| 7,916,706 B2 | 3/2011 | Kubler et al. |
| 7,917,177 B2 | 3/2011 | Bauman |
| 7,920,553 B2 | 4/2011 | Kubler et al. |
| 7,920,858 B2 | 4/2011 | Sabat, Jr. et al. |
| 7,924,783 B1 | 4/2011 | Mahany et al. |
| 7,936,713 B2 | 5/2011 | Kubler et al. |
| 7,949,364 B2 | 5/2011 | Kasslin et al. |
| 7,957,777 B1 | 6/2011 | Vu et al. |
| 7,962,111 B2 | 6/2011 | Solum |
| 7,969,009 B2 | 6/2011 | Chandrasekaran |
| 7,969,911 B2 | 6/2011 | Mahany et al. |
| 7,990,925 B2 | 8/2011 | Tinnakornsrisuphap et al. |
| 7,996,020 B1 | 8/2011 | Chhabra |
| 8,018,907 B2 | 9/2011 | Kubler et al. |
| 8,023,886 B2 | 9/2011 | Rofougaran |
| 8,027,656 B2 | 9/2011 | Rofougaran et al. |
| 8,036,308 B2 | 10/2011 | Rofougaran |
| 8,082,353 B2 | 12/2011 | Huber et al. |
| 8,086,192 B2 | 12/2011 | Rofougaran et al. |
| 8,135,102 B2 | 3/2012 | Wiwel et al. |
| 8,213,401 B2 | 7/2012 | Fischer et al. |
| 8,223,795 B2 | 7/2012 | Cox et al. |

(56) References Cited

U.S. PATENT DOCUMENTS

| | | |
|---|---|---|
| 8,238,463 B1 | 8/2012 | Arslan et al. |
| 8,270,387 B2 | 9/2012 | Cannon et al. |
| 8,290,483 B2 | 10/2012 | Sabat, Jr. et al. |
| 8,306,563 B2 | 11/2012 | Zavadsky et al. |
| 8,346,278 B2 | 1/2013 | Wala et al. |
| 8,428,201 B1 | 4/2013 | McHann, Jr. et al. |
| 8,428,510 B2 | 4/2013 | Stratford et al. |
| 8,462,683 B2 | 6/2013 | Uyehara et al. |
| 8,472,579 B2 | 6/2013 | Uyehara et al. |
| 8,509,215 B2 | 8/2013 | Stuart |
| 8,509,850 B2 | 8/2013 | Zavadsky et al. |
| 8,526,970 B2 | 9/2013 | Wala et al. |
| 8,532,242 B2 | 9/2013 | Fischer et al. |
| 8,626,245 B2 | 1/2014 | Zavadsky et al. |
| 8,737,454 B2 | 5/2014 | Wala et al. |
| 8,743,718 B2 | 6/2014 | Grenier et al. |
| 8,743,756 B2 | 6/2014 | Uyehara et al. |
| 8,837,659 B2 | 9/2014 | Uyehara et al. |
| 8,837,940 B2 | 9/2014 | Smith et al. |
| 8,873,585 B2 | 10/2014 | Oren et al. |
| 8,929,288 B2 | 1/2015 | Stewart et al. |
| 2001/0036163 A1 | 11/2001 | Sabat, Jr. et al. |
| 2001/0036199 A1 | 11/2001 | Terry |
| 2002/0003645 A1 | 1/2002 | Kim et al. |
| 2002/0009070 A1 | 1/2002 | Lindsay et al. |
| 2002/0012336 A1 | 1/2002 | Hughes et al. |
| 2002/0012495 A1 | 1/2002 | Sasai et al. |
| 2002/0016827 A1 | 2/2002 | McCabe et al. |
| 2002/0045519 A1 | 4/2002 | Watterson et al. |
| 2002/0048071 A1 | 4/2002 | Suzuki et al. |
| 2002/0051434 A1 | 5/2002 | Ozluturk et al. |
| 2002/0075906 A1 | 6/2002 | Cole et al. |
| 2002/0092347 A1 | 7/2002 | Niekerk et al. |
| 2002/0097564 A1 | 7/2002 | Struhsaker et al. |
| 2002/0103012 A1 | 8/2002 | Kim et al. |
| 2002/0111149 A1 | 8/2002 | Shoki |
| 2002/0111192 A1 | 8/2002 | Thomas et al. |
| 2002/0114038 A1 | 8/2002 | Arnon et al. |
| 2002/0123365 A1 | 9/2002 | Thorson et al. |
| 2002/0126967 A1 | 9/2002 | Panak et al. |
| 2002/0128009 A1 | 9/2002 | Boch et al. |
| 2002/0130778 A1 | 9/2002 | Nicholson |
| 2002/0181668 A1 | 12/2002 | Masoian et al. |
| 2002/0190845 A1 | 12/2002 | Moore |
| 2002/0197984 A1 | 12/2002 | Monin et al. |
| 2003/0002604 A1 | 1/2003 | Fifield et al. |
| 2003/0007214 A1 | 1/2003 | Aburakawa et al. |
| 2003/0016418 A1 | 1/2003 | Westbrook et al. |
| 2003/0045284 A1 | 3/2003 | Copley et al. |
| 2003/0069922 A1 | 4/2003 | Arunachalam |
| 2003/0078074 A1 | 4/2003 | Sesay et al. |
| 2003/0112826 A1 | 6/2003 | Ashwood Smith et al. |
| 2003/0141962 A1 | 7/2003 | Barink |
| 2003/0161637 A1 | 8/2003 | Yamamoto et al. |
| 2003/0165287 A1 | 9/2003 | Krill et al. |
| 2003/0174099 A1 | 9/2003 | Bauer et al. |
| 2003/0209601 A1 | 11/2003 | Chung |
| 2004/0001719 A1 | 1/2004 | Sasaki |
| 2004/0008114 A1 | 1/2004 | Sawyer |
| 2004/0017785 A1 | 1/2004 | Zelst |
| 2004/0037565 A1 | 2/2004 | Young et al. |
| 2004/0041714 A1 | 3/2004 | Forster |
| 2004/0043764 A1 | 3/2004 | Bigham et al. |
| 2004/0047313 A1 | 3/2004 | Rumpf et al. |
| 2004/0078151 A1 | 4/2004 | Aljadeff et al. |
| 2004/0095907 A1 | 5/2004 | Agee et al. |
| 2004/0100930 A1 | 5/2004 | Shapira et al. |
| 2004/0106435 A1 | 6/2004 | Bauman et al. |
| 2004/0126068 A1 | 7/2004 | Van Bijsterveld |
| 2004/0126107 A1 | 7/2004 | Jay et al. |
| 2004/0139477 A1 | 7/2004 | Russell et al. |
| 2004/0146020 A1 | 7/2004 | Kubler et al. |
| 2004/0149736 A1 | 8/2004 | Clothier |
| 2004/0151164 A1 | 8/2004 | Kubler et al. |
| 2004/0151503 A1 | 8/2004 | Kashima et al. |
| 2004/0157623 A1 | 8/2004 | Splett |
| 2004/0160912 A1 | 8/2004 | Kubler et al. |
| 2004/0160913 A1 | 8/2004 | Kubler et al. |
| 2004/0162084 A1 | 8/2004 | Wang |
| 2004/0162115 A1 | 8/2004 | Smith et al. |
| 2004/0162116 A1 | 8/2004 | Han et al. |
| 2004/0165573 A1 | 8/2004 | Kubler et al. |
| 2004/0175173 A1 | 9/2004 | Deas |
| 2004/0196404 A1 | 10/2004 | Loheit et al. |
| 2004/0202257 A1 | 10/2004 | Mehta et al. |
| 2004/0203703 A1 | 10/2004 | Fischer |
| 2004/0203704 A1 | 10/2004 | Ommodt et al. |
| 2004/0203846 A1 | 10/2004 | Caronni et al. |
| 2004/0204109 A1 | 10/2004 | Hoppenstein |
| 2004/0208526 A1 | 10/2004 | Mibu |
| 2004/0208643 A1 | 10/2004 | Roberts et al. |
| 2004/0215723 A1 | 10/2004 | Chadha |
| 2004/0218873 A1 | 11/2004 | Nagashima et al. |
| 2004/0233877 A1 | 11/2004 | Lee et al. |
| 2004/0258105 A1 | 12/2004 | Spathas et al. |
| 2004/0267971 A1 | 12/2004 | Seshadri |
| 2005/0052287 A1 | 3/2005 | Whitesmith et al. |
| 2005/0058451 A1 | 3/2005 | Ross |
| 2005/0059437 A1* | 3/2005 | Son ............. H04W 52/0245 455/574 |
| 2005/0068179 A1 | 3/2005 | Roesner |
| 2005/0076982 A1 | 4/2005 | Metcalf et al. |
| 2005/0078006 A1 | 4/2005 | Hutchins |
| 2005/0093679 A1 | 5/2005 | Zai et al. |
| 2005/0099343 A1 | 5/2005 | Asrani et al. |
| 2005/0116821 A1 | 6/2005 | Wilsey et al. |
| 2005/0123232 A1 | 6/2005 | Piede et al. |
| 2005/0141545 A1 | 6/2005 | Fein et al. |
| 2005/0143077 A1 | 6/2005 | Charbonneau |
| 2005/0147067 A1 | 7/2005 | Mani et al. |
| 2005/0147071 A1 | 7/2005 | Karaoguz et al. |
| 2005/0148306 A1 | 7/2005 | Hiddink |
| 2005/0159108 A1 | 7/2005 | Fletcher |
| 2005/0174236 A1 | 8/2005 | Brookner |
| 2005/0176458 A1 | 8/2005 | Shklarsky et al. |
| 2005/0201323 A1 | 9/2005 | Mani et al. |
| 2005/0201761 A1 | 9/2005 | Bartur et al. |
| 2005/0219050 A1 | 10/2005 | Martin |
| 2005/0224585 A1 | 10/2005 | Durrant et al. |
| 2005/0226625 A1 | 10/2005 | Wake et al. |
| 2005/0232636 A1 | 10/2005 | Durrant et al. |
| 2005/0242188 A1 | 11/2005 | Vesuna |
| 2005/0252971 A1 | 11/2005 | Howarth et al. |
| 2005/0266797 A1 | 12/2005 | Utsumi et al. |
| 2005/0266854 A1 | 12/2005 | Niiho et al. |
| 2005/0269930 A1 | 12/2005 | Shimizu et al. |
| 2005/0271396 A1 | 12/2005 | Iannelli |
| 2005/0272439 A1 | 12/2005 | Picciriello et al. |
| 2006/0002326 A1 | 1/2006 | Vesuna |
| 2006/0014548 A1 | 1/2006 | Bolin |
| 2006/0017633 A1 | 1/2006 | Pronkine |
| 2006/0028352 A1 | 2/2006 | McNamara et al. |
| 2006/0045054 A1 | 3/2006 | Utsumi et al. |
| 2006/0045524 A1 | 3/2006 | Lee et al. |
| 2006/0045525 A1 | 3/2006 | Lee et al. |
| 2006/0053324 A1 | 3/2006 | Giat et al. |
| 2006/0056327 A1 | 3/2006 | Coersmeier |
| 2006/0062579 A1 | 3/2006 | Kim et al. |
| 2006/0083520 A1 | 4/2006 | Healey et al. |
| 2006/0094470 A1 | 5/2006 | Wake et al. |
| 2006/0104643 A1 | 5/2006 | Lee et al. |
| 2006/0159388 A1 | 7/2006 | Kawase et al. |
| 2006/0172775 A1 | 8/2006 | Conyers et al. |
| 2006/0182446 A1 | 8/2006 | Kim et al. |
| 2006/0182449 A1 | 8/2006 | Iannelli et al. |
| 2006/0189354 A1 | 8/2006 | Lee et al. |
| 2006/0209745 A1 | 9/2006 | MacMullan et al. |
| 2006/0223439 A1 | 10/2006 | Pinel et al. |
| 2006/0233506 A1 | 10/2006 | Noonan et al. |
| 2006/0239630 A1 | 10/2006 | Hase et al. |
| 2006/0268738 A1 | 11/2006 | Goerke et al. |
| 2006/0274704 A1 | 12/2006 | Desai et al. |
| 2007/0009266 A1 | 1/2007 | Bothwell |
| 2007/0050451 A1 | 3/2007 | Caspi et al. |

(56) References Cited

U.S. PATENT DOCUMENTS

| | | |
|---|---|---|
| 2007/0054682 A1 | 3/2007 | Fanning et al. |
| 2007/0058978 A1 | 3/2007 | Lee et al. |
| 2007/0060045 A1 | 3/2007 | Prautzsch |
| 2007/0060055 A1 | 3/2007 | Desai et al. |
| 2007/0071128 A1 | 3/2007 | Meir et al. |
| 2007/0076649 A1 | 4/2007 | Lin et al. |
| 2007/0093273 A1 | 4/2007 | Cai |
| 2007/0149250 A1 | 6/2007 | Crozzoli et al. |
| 2007/0166042 A1 | 7/2007 | Seeds et al. |
| 2007/0173288 A1 | 7/2007 | Skarby et al. |
| 2007/0174889 A1 | 7/2007 | Kim et al. |
| 2007/0224954 A1 | 9/2007 | Gopi |
| 2007/0230328 A1 | 10/2007 | Saitou |
| 2007/0243899 A1 | 10/2007 | Hermel et al. |
| 2007/0248358 A1 | 10/2007 | Sauer |
| 2007/0253714 A1 | 11/2007 | Seeds et al. |
| 2007/0257796 A1 | 11/2007 | Easton et al. |
| 2007/0264009 A1 | 11/2007 | Sabat, Jr. et al. |
| 2007/0264011 A1 | 11/2007 | Sone et al. |
| 2007/0268846 A1 | 11/2007 | Proctor et al. |
| 2007/0274279 A1 | 11/2007 | Wood et al. |
| 2007/0292143 A1 | 12/2007 | Yu et al. |
| 2007/0297005 A1 | 12/2007 | Montierth et al. |
| 2008/0002652 A1 | 1/2008 | Gupta et al. |
| 2008/0007453 A1 | 1/2008 | Vassilakis et al. |
| 2008/0013909 A1 | 1/2008 | Kostet et al. |
| 2008/0013956 A1 | 1/2008 | Ware et al. |
| 2008/0013957 A1 | 1/2008 | Akers et al. |
| 2008/0014948 A1* | 1/2008 | Scheinert ............ H04W 84/047 455/444 |
| 2008/0026765 A1 | 1/2008 | Charbonneau |
| 2008/0031628 A1 | 2/2008 | Dragas et al. |
| 2008/0043714 A1 | 2/2008 | Pernu |
| 2008/0056167 A1 | 3/2008 | Kim et al. |
| 2008/0058018 A1 | 3/2008 | Scheinert |
| 2008/0063397 A1 | 3/2008 | Hu et al. |
| 2008/0070502 A1 | 3/2008 | George et al. |
| 2008/0080863 A1 | 4/2008 | Sauer et al. |
| 2008/0098203 A1 | 4/2008 | Master et al. |
| 2008/0118014 A1 | 5/2008 | Reunamaki et al. |
| 2008/0119198 A1 | 5/2008 | Hettstedt et al. |
| 2008/0124086 A1 | 5/2008 | Matthews |
| 2008/0124087 A1 | 5/2008 | Hartmann et al. |
| 2008/0129634 A1 | 6/2008 | Pera et al. |
| 2008/0134194 A1 | 6/2008 | Liu |
| 2008/0145061 A1 | 6/2008 | Lee et al. |
| 2008/0150514 A1 | 6/2008 | Codreanu et al. |
| 2008/0166094 A1 | 7/2008 | Bookbinder et al. |
| 2008/0194226 A1 | 8/2008 | Rivas et al. |
| 2008/0207253 A1 | 8/2008 | Jaakkola et al. |
| 2008/0212969 A1 | 9/2008 | Fasshauer et al. |
| 2008/0219670 A1 | 9/2008 | Kim |
| 2008/0232305 A1 | 9/2008 | Oren et al. |
| 2008/0232799 A1 | 9/2008 | Kim |
| 2008/0247716 A1 | 10/2008 | Thomas |
| 2008/0253280 A1 | 10/2008 | Tang et al. |
| 2008/0253351 A1 | 10/2008 | Pernu et al. |
| 2008/0253773 A1 | 10/2008 | Zheng |
| 2008/0260388 A1 | 10/2008 | Kim et al. |
| 2008/0261656 A1 | 10/2008 | Bella et al. |
| 2008/0268766 A1 | 10/2008 | Narkmon et al. |
| 2008/0268833 A1 | 10/2008 | Huang et al. |
| 2008/0273844 A1 | 11/2008 | Kewitsch |
| 2008/0279137 A1 | 11/2008 | Pernu et al. |
| 2008/0280569 A1 | 11/2008 | Hazani et al. |
| 2008/0291830 A1 | 11/2008 | Pernu et al. |
| 2008/0292322 A1 | 11/2008 | Daghighian et al. |
| 2008/0298813 A1 | 12/2008 | Song et al. |
| 2008/0304831 A1 | 12/2008 | Miller, II et al. |
| 2008/0310464 A1 | 12/2008 | Schneider |
| 2008/0310848 A1 | 12/2008 | Yasuda et al. |
| 2008/0311876 A1 | 12/2008 | Leenaerts et al. |
| 2008/0311944 A1 | 12/2008 | Hansen et al. |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0041413 A1 | 2/2009 | Hurley |
| 2009/0047023 A1 | 2/2009 | Pescod et al. |
| 2009/0059903 A1 | 3/2009 | Kubler et al. |
| 2009/0061796 A1 | 3/2009 | Arkko et al. |
| 2009/0061939 A1 | 3/2009 | Andersson et al. |
| 2009/0073916 A1 | 3/2009 | Zhang et al. |
| 2009/0081985 A1 | 3/2009 | Rofougaran et al. |
| 2009/0087179 A1 | 4/2009 | Underwood et al. |
| 2009/0088071 A1 | 4/2009 | Rofougaran |
| 2009/0088072 A1 | 4/2009 | Rofougaran et al. |
| 2009/0135078 A1 | 5/2009 | Lindmark et al. |
| 2009/0141780 A1 | 6/2009 | Cruz-Albrecht et al. |
| 2009/0149221 A1 | 6/2009 | Liu et al. |
| 2009/0154621 A1 | 6/2009 | Shapira et al. |
| 2009/0169163 A1 | 7/2009 | Abbott, III et al. |
| 2009/0175214 A1 | 7/2009 | Sfar et al. |
| 2009/0180407 A1 | 7/2009 | Sabat et al. |
| 2009/0180426 A1 | 7/2009 | Sabat et al. |
| 2009/0218407 A1 | 9/2009 | Rofougaran |
| 2009/0218657 A1 | 9/2009 | Rofougaran |
| 2009/0237317 A1 | 9/2009 | Rofougaran |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0247109 A1 | 10/2009 | Rofougaran |
| 2009/0252136 A1 | 10/2009 | Mahany et al. |
| 2009/0252139 A1 | 10/2009 | Ludovico et al. |
| 2009/0252205 A1 | 10/2009 | Rheinfelder et al. |
| 2009/0258652 A1 | 10/2009 | Lambert et al. |
| 2009/0278596 A1 | 11/2009 | Rofougaran et al. |
| 2009/0279593 A1 | 11/2009 | Rofougaran et al. |
| 2009/0285147 A1 | 11/2009 | Subasic et al. |
| 2009/0316608 A1 | 12/2009 | Singh et al. |
| 2009/0319909 A1 | 12/2009 | Hsueh et al. |
| 2010/0002626 A1 | 1/2010 | Schmidt et al. |
| 2010/0002661 A1 | 1/2010 | Schmidt et al. |
| 2010/0002662 A1 | 1/2010 | Schmidt et al. |
| 2010/0014494 A1 | 1/2010 | Schmidt et al. |
| 2010/0027443 A1 | 2/2010 | LoGalbo et al. |
| 2010/0056200 A1 | 3/2010 | Tolonen |
| 2010/0080154 A1 | 4/2010 | Noh et al. |
| 2010/0080182 A1 | 4/2010 | Kubler et al. |
| 2010/0091475 A1 | 4/2010 | Toms et al. |
| 2010/0118864 A1 | 5/2010 | Kubler et al. |
| 2010/0127937 A1 | 5/2010 | Chandrasekaran et al. |
| 2010/0134257 A1 | 6/2010 | Puleston et al. |
| 2010/0142598 A1 | 6/2010 | Murray et al. |
| 2010/0142955 A1 | 6/2010 | Yu et al. |
| 2010/0144285 A1 | 6/2010 | Behzad et al. |
| 2010/0148373 A1 | 6/2010 | Chandrasekaran |
| 2010/0156721 A1 | 6/2010 | Alamouti et al. |
| 2010/0159859 A1 | 6/2010 | Rofougaran |
| 2010/0188998 A1 | 7/2010 | Pernu et al. |
| 2010/0189439 A1 | 7/2010 | Novak et al. |
| 2010/0190509 A1 | 7/2010 | Davis |
| 2010/0202326 A1 | 8/2010 | Rofougaran et al. |
| 2010/0225413 A1 | 9/2010 | Rofougaran et al. |
| 2010/0225520 A1 | 9/2010 | Mohamadi et al. |
| 2010/0225556 A1 | 9/2010 | Rofougaran et al. |
| 2010/0225557 A1 | 9/2010 | Rofougaran et al. |
| 2010/0232323 A1 | 9/2010 | Kubler et al. |
| 2010/0246558 A1 | 9/2010 | Harel |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0261501 A1 | 10/2010 | Behzad et al. |
| 2010/0266287 A1 | 10/2010 | Adhikari et al. |
| 2010/0278530 A1 | 11/2010 | Kummetz et al. |
| 2010/0284323 A1 | 11/2010 | Tang et al. |
| 2010/0290355 A1 | 11/2010 | Roy et al. |
| 2010/0309049 A1 | 12/2010 | Reunamäki et al. |
| 2010/0311472 A1 | 12/2010 | Rofougaran et al. |
| 2010/0311480 A1 | 12/2010 | Raines et al. |
| 2010/0329161 A1 | 12/2010 | Ylanen et al. |
| 2010/0329166 A1 | 12/2010 | Mahany et al. |
| 2010/0329680 A1 | 12/2010 | Presi et al. |
| 2011/0002687 A1 | 1/2011 | Sabat, Jr. et al. |
| 2011/0007724 A1 | 1/2011 | Mahany et al. |

(56) References Cited

U.S. PATENT DOCUMENTS

| | | |
|---|---|---|
| 2011/0007733 A1 | 1/2011 | Kubler et al. |
| 2011/0008042 A1 | 1/2011 | Stewart |
| 2011/0019999 A1 | 1/2011 | George et al. |
| 2011/0021146 A1 | 1/2011 | Pernu |
| 2011/0021224 A1 | 1/2011 | Koskinen et al. |
| 2011/0026932 A1 | 2/2011 | Yeh et al. |
| 2011/0045767 A1 | 2/2011 | Rofougaran et al. |
| 2011/0065450 A1 | 3/2011 | Kazmi |
| 2011/0066774 A1 | 3/2011 | Rofougaran |
| 2011/0069668 A1 | 3/2011 | Chion et al. |
| 2011/0071734 A1 | 3/2011 | Van Wiemeersch et al. |
| 2011/0086614 A1 | 4/2011 | Brisebois et al. |
| 2011/0116393 A1 | 5/2011 | Hong et al. |
| 2011/0116572 A1 | 5/2011 | Lee et al. |
| 2011/0122912 A1 | 5/2011 | Benjamin et al. |
| 2011/0126071 A1 | 5/2011 | Han et al. |
| 2011/0149879 A1 | 6/2011 | Noriega et al. |
| 2011/0158298 A1 | 6/2011 | Djadi et al. |
| 2011/0182230 A1 | 7/2011 | Ohm et al. |
| 2011/0194475 A1 | 8/2011 | Kim et al. |
| 2011/0200328 A1 | 8/2011 | In De Betou et al. |
| 2011/0201368 A1 | 8/2011 | Faccin et al. |
| 2011/0204504 A1 | 8/2011 | Henderson et al. |
| 2011/0206383 A1 | 8/2011 | Chien et al. |
| 2011/0211439 A1 | 9/2011 | Manpuria et al. |
| 2011/0215901 A1 | 9/2011 | Van Wiemeersch et al. |
| 2011/0222415 A1 | 9/2011 | Ramamurthi et al. |
| 2011/0222434 A1 | 9/2011 | Chen |
| 2011/0222619 A1 | 9/2011 | Ramamurthi et al. |
| 2011/0227795 A1 | 9/2011 | Lopez et al. |
| 2011/0244887 A1 | 10/2011 | Dupray et al. |
| 2011/0256878 A1 | 10/2011 | Zhu et al. |
| 2011/0268033 A1 | 11/2011 | Boldi et al. |
| 2011/0274021 A1 | 11/2011 | He et al. |
| 2011/0281536 A1 | 11/2011 | Lee et al. |
| 2012/0052892 A1 | 3/2012 | Braithwaite |
| 2012/0177026 A1 | 7/2012 | Uyehara et al. |
| 2013/0012195 A1 | 1/2013 | Sabat, Jr. et al. |
| 2013/0070816 A1 | 3/2013 | Aoki et al. |
| 2013/0071112 A1 | 3/2013 | Melester et al. |
| 2013/0089332 A1 | 4/2013 | Sauer et al. |
| 2013/0095870 A1 | 4/2013 | Phillips et al. |
| 2013/0210490 A1 | 8/2013 | Fischer et al. |
| 2013/0252651 A1 | 9/2013 | Zavadsky et al. |
| 2013/0260705 A1 | 10/2013 | Stratford |
| 2014/0016583 A1 | 1/2014 | Smith |
| 2014/0140225 A1 | 5/2014 | Wala |
| 2014/0146797 A1 | 5/2014 | Zavadsky et al. |
| 2014/0146905 A1 | 5/2014 | Zavadsky et al. |
| 2014/0146906 A1 | 5/2014 | Zavadsky et al. |
| 2014/0219140 A1 | 8/2014 | Uyehara et al. |

FOREIGN PATENT DOCUMENTS

| | | | |
|---|---|---|---|
| CA | 2065090 C | 2/1998 | |
| CA | 2242707 A1 | 1/1999 | |
| CN | 101389148 A | 3/2009 | |
| CN | 101547447 A | 9/2009 | |
| DE | 20104862 U1 | 8/2001 | |
| DE | 10249414 A1 | 5/2004 | |
| EP | 0477952 A2 | 4/1992 | |
| EP | 0477952 A3 | 4/1992 | |
| EP | 0461583 B1 | 3/1997 | |
| EP | 851618 A2 | 7/1998 | |
| EP | 0687400 B1 | 11/1998 | |
| EP | 0993124 A2 | 4/2000 | |
| EP | 1037411 A2 | 9/2000 | |
| EP | 1179895 A1 | 2/2002 | |
| EP | 1267447 A1 | 12/2002 | |
| EP | 1347584 A2 | 9/2003 | |
| EP | 1363352 A1 | 11/2003 | |
| EP | 1391897 A1 | 2/2004 | |
| EP | 1443687 A1 | 8/2004 | |
| EP | 1455550 A2 | 9/2004 | |
| EP | 1501206 A1 | 1/2005 | |
| EP | 1503451 A1 | 2/2005 | |
| EP | 1530316 A1 | 5/2005 | |
| EP | 1511203 B1 | 3/2006 | |
| EP | 1267447 B1 | 8/2006 | |
| EP | 1693974 A1 | 8/2006 | |
| EP | 1742388 A1 | 1/2007 | |
| EP | 1227605 B1 | 1/2008 | |
| EP | 1942598 A2 | 7/2008 | H04J 14/02 |
| EP | 1954019 A1 | 8/2008 | |
| EP | 1968250 A1 | 9/2008 | |
| EP | 1056226 B1 | 4/2009 | |
| EP | 1357683 B1 | 5/2009 | |
| EP | 2276298 A1 | 1/2011 | |
| EP | 1570626 B1 | 11/2013 | |
| GB | 2323252 A | 9/1998 | |
| GB | 2370170 A | 6/2002 | |
| GB | 2399963 A | 9/2004 | |
| GB | 2428149 A | 1/2007 | |
| JP | H4189036 A | 7/1992 | |
| JP | 05260018 A | 10/1993 | |
| JP | 09083450 A | 3/1997 | |
| JP | 09162810 A | 6/1997 | |
| JP | 09200840 A | 7/1997 | |
| JP | 11068675 A | 3/1999 | |
| JP | 2000152300 A | 5/2000 | |
| JP | 2000341744 A | 12/2000 | |
| JP | 2002264617 A | 9/2002 | |
| JP | 2002353813 A | 12/2002 | |
| JP | 2003148653 A | 5/2003 | |
| JP | 2003172827 A | 6/2003 | |
| JP | 2004172734 A | 6/2004 | |
| JP | 2004245963 A | 9/2004 | |
| JP | 2004247090 A | 9/2004 | |
| JP | 2004264901 A | 9/2004 | |
| JP | 2004265624 A | 9/2004 | |
| JP | 2004317737 A | 11/2004 | |
| JP | 2004349184 A | 12/2004 | |
| JP | 2005018175 A | 1/2005 | |
| JP | 2005087135 A | 4/2005 | |
| JP | 2005134125 A | 5/2005 | |
| JP | 2007228603 A | 9/2007 | |
| JP | 2008172597 A | 7/2008 | |
| KR | 20010055088 A | 7/2001 | |
| WO | 9603823 A1 | 2/1996 | |
| WO | 9810600 A1 | 3/1998 | |
| WO | 0042721 A1 | 7/2000 | |
| WO | 0072475 A1 | 11/2000 | |
| WO | 0230141 A1 | 4/2001 | |
| WO | 0178434 A1 | 10/2001 | |
| WO | 0184760 A1 | 11/2001 | |
| WO | 0221183 A1 | 3/2002 | |
| WO | 02102102 A1 | 12/2002 | |
| WO | 03024027 A1 | 3/2003 | |
| WO | 03098175 A1 | 11/2003 | |
| WO | 2004030154 A2 | 4/2004 | |
| WO | 2004047472 A1 | 6/2004 | |
| WO | 2004056019 A1 | 7/2004 | |
| WO | 2004059934 A1 | 7/2004 | |
| WO | 2004086795 A2 | 10/2004 | |
| WO | 2004093471 A2 | 10/2004 | |
| WO | 2005062505 A1 | 7/2005 | |
| WO | 2005069203 A1 | 7/2005 | |
| WO | 2005073897 A1 | 8/2005 | |
| WO | 2005079386 A2 | 9/2005 | |
| WO | 2005101701 A2 | 10/2005 | |
| WO | 2005111959 A2 | 11/2005 | |
| WO | 2006011778 A1 | 2/2006 | |
| WO | 2006018592 A1 | 2/2006 | |
| WO | 2006019392 A1 | 2/2006 | |
| WO | 2006039941 A1 | 4/2006 | |
| WO | 2006051262 A1 | 5/2006 | |
| WO | 2006060754 A1 | 6/2006 | |
| WO | 2006077569 A1 | 7/2006 | |
| WO | 2006105185 A2 | 10/2006 | |
| WO | 2006133609 A1 | 12/2006 | |
| WO | 2006136811 A1 | 12/2006 | |
| WO | 2007048427 A1 | 5/2007 | |
| WO | 2007077451 A1 | 7/2007 | |
| WO | 2007088561 A1 | 8/2007 | |

(56) References Cited

FOREIGN PATENT DOCUMENTS

| | | |
|---|---|---|
| WO | 2007091026 A1 | 8/2007 |
| WO | 2008008249 A2 | 1/2008 |
| WO | 2008027213 A2 | 3/2008 |
| WO | 2008033298 A2 | 3/2008 |
| WO | 2008039830 A2 | 4/2008 |
| WO | 2008116014 A2 | 9/2008 |
| WO | 2006046088 A1 | 5/2009 |
| WO | 2010090999 A1 | 8/2010 |
| WO | 2010132739 A1 | 11/2010 |
| WO | 2011023592 A1 | 3/2011 |
| WO | 2011100095 A1 | 8/2011 |
| WO | 2011139939 A1 | 11/2011 |
| WO | 2012148938 A1 | 11/2012 |
| WO | 2012148940 A1 | 11/2012 |
| WO | 2013122915 A1 | 8/2013 |
| WO | 2015029021 A1 | 3/2015 |

OTHER PUBLICATIONS

Biton et al., "Challenge: CeTV and Ca-Fi—Cellular and Wi-Fi over CATV," Proceedings of the Eleventh Annual International Conference on Mobile Computing and Networking, Aug. 28-Sep. 2, 2005, Cologne, Germany, Association for Computing Machinery, 8 pages.

International Preliminary Report on Patentability for PCT/IL2013/050671 mailed Feb. 10, 2015, 6 pages.

Author Unknown, "Technical Specification Group Radio Access Network; Evolved Universal Terrestrial Radio Access (E-UTRA); Physical channels and modulation (Release 12)," Technical Specification 36.211, Version 12.7.0, 3GPP Organizational Partners, Sep. 2015, 136 pages.

Arredondo, Albedo et al., "Techniques for Improving In-Building Radio Coverage Using Fiber-Fed Distributed Antenna Networks," IEEE 46th Vehicular Technology Conference, Atlanta, Georgia, Apr. 28-May 1, 1996, pp. 1540-1543, vol. 3.

Bakaul, M., et al., "Efficient Multiplexing Scheme for Wavelength-Interleaved DWDM Millimeter-Wave Fiber-Radio Systems," IEEE Photonics Technology Letters, Dec. 2005, vol. 17, No. 12, pp. 2718-2720.

Cho, Bong Youl et al. "The Forward Link Performance of a PCS System with an AGC," 4th CDMA International Conference and Exhibition, "The Realization of IMT-2000," 1999, 10 pages.

Chu, Ta-Shing et al. "Fiber optic microcellular radio", IEEE Transactions on Vehicular Technology, Aug. 1991, pp. 599-606, vol. 40, Issue 3.

Cooper, A.J., "Fiber/Radio for the Provision of Cordless/Mobile Telephony Services in the Access Network," Electronics Letters, 1990, pp. 2054-2056, vol. 26.

Cutrer, David M. et al., "Dynamic Range Requirements for Optical Transmitters in Fiber-Fed Microcellular Networks," IEEE Photonics Technology Letters, May 1995, pp. 564-566, vol. 7, No. 5.

Dolmans, G. et al. "Performance study of an adaptive dual antenna handset for indoor communications", IEE Proceedings: Microwaves, Antennas and Propagation, Apr. 1999, pp. 138-144, vol. 146, Issue 2.

Ellinger, Frank et al., "A 5.2 GHz variable gain LNA MMIC for adaptive antenna combining", IEEE MTT-S International Microwave Symposium Digest, Anaheim, California, Jun. 13-19, 1999, pp. 501-504, vol. 2.

Fan, J.C. et al., "Dynamic range requirements for microcellular personal communication systems using analog fiber-optic links", IEEE Transactions on Microwave Theory and Techniques, Aug. 1997, pp. 1390-1397, vol. 45, Issue 8.

Gibson, B.C., et al., "Evanescent Field Analysis of Air-Silica Microstructure Waveguides," the 14th Annual Meeting of the IEEE Lasers and Electro-Optics Society, 1-7803-7104-4/01, Nov. 12-13, 2001, vol. 2, pp. 709-710.

Huang, C., et al., "A WLAN-Used Helical Antenna Fully Integrated with the PCMCIA Carrier," IEEE Transactions on Antennas and Propagation, Dec. 2005, vol. 53, No. 12, pp. 4164-4168.

Kojucharow, K., et al., "Millimeter-Wave Signal Properties Resulting from Electrooptical Upconversion," IEEE Transaction on Microwave Theory and Techniques, Oct. 2001, vol. 49, No. 10, pp. 1977-1985.

Monro, T.M., et al., "Holey Fibers with Random Cladding Distributions," Optics Letters, Feb. 15, 2000, vol. 25, No. 4, pp. 206-208.

Moreira, J.D., et al., "Diversity Techniques for OFDM Based WLAN Systems," The 13th IEEE International Symposium on Personal, Indoor and Mobile Radio Communications, Sep. 15-18, 2002, vol. 3, pp. 1008-1011.

Niiho, T., et al., "Multi-Channel Wireless LAN Distributed Antenna System Based on Radio-Over-Fiber Techniques," The 17th Annual Meeting of the IEEE Lasers and Electro-Optics Society, Nov. 2004, vol. 1, pp. 57-58.

Author Unknown, "ITU-T G.652, Telecommunication Standardization Sector of ITU, Series G: Transmission Systems and Media, Digital Systems and Networks, Transmission Media and Optical Systems Characteristics—Optical Fibre Cables, Characteristics of a Single-Mode Optical Fiber and Cable," ITU-T Recommendation G.652, International Telecommunication Union, Jun. 2005, 22 pages.

Author Unknown, "ITU-T G.657, Telecommunication Standardization Sector of ITU, Dec. 2006, Series G: Transmission Systems and Media, Digital Systems and Networks, Transmission Media and Optical Systems Characteristics—Optical Fibre Cables, Characteristics of a Bending Loss Insensitive Single Mode Optical Fibre and Cable for the Access Network," ITU-T Recommendation G.657, International Telecommunication Union, 20 pages.

Author Unknown, RFID Technology Overview, Date Unknown, 11 pages.

Opatic, D., "Radio over Fiber Technology for Wireless Access," Ericsson, Oct. 17, 2009, 6 pages.

Paulraj, A.J., et al., "An Overview of MIMO Communications—A Key to Gigabit Wireless," Proceedings of the IEEE, Feb. 2004, vol. 92, No. 2, 34 pages.

Pickrell, G.R., et al., "Novel Techniques for the Fabrication of Holey Optical Fibers," Proceedings of SPIE, Oct. 28-Nov. 2, 2001, vol. 4578, 2001, pp. 271-282.

Roh, W., et al., "MIMO Channel Capacity for the Distributed Antenna Systems," Proceedings of the 56th IEEE Vehicular Technology Conference, Sep. 2002, vol. 2, pp. 706-709.

Schweber, Bill, "Maintaining cellular connectivity indoors demands sophisticated design," EDN Network, Dec. 21, 2000, 2 pages, http://www.edn.com/design/integrated-circuit-design/4362776/Maintaining-cellular-connectivity-indoors-demands-sophisticated-design.

Seto, I., et al., "Antenna-Selective Transmit Diversity Technique for OFDM-Based WLANs with Dual-Band Printed Antennas," 2005 IEEE Wireless Communications and Networking Conference, Mar. 13-17, 2005, vol. 1, pp. 51-56.

Shen, C., et al., "Comparison of Channel Capacity for MIMO-DAS versus MIMO-CAS," The 9th Asia-Pacific Conference on Communications, Sep. 21-24, 2003, vol. 1, pp. 113-118.

Wake, D. et al., "Passive Picocell: A New Concept n Wireless Network Infrastructure," Electronics Letters, Feb. 27, 1997, vol. 33, No. 5, pp. 404-406.

Windyka, John et al., "System-Level Integrated Circuit (SLIC) Technology Development for Phased Array Antenna Applications," Contractor Report 204132, National Aeronautics and Space Administration, Jul. 1997, 94 pages.

Winters, J., et al., "The Impact of Antenna Diversity on the Capacity of Wireless Communications Systems," IEEE Transcations on Communications, vol. 42, No. 2/3/4, Feb./Mar./Apr. 1994, pp. 1740-1751.

Yu et al., "A Novel Scheme to Generate Single-Sideband Millimeter-Wave Signals by Using Low-Frequency Local Oscillator Signal," IEEE Photonics Technology Letters, vol. 20, No. 7, Apr. 1, 2008, pp. 478-480.

Attygalle et al., "Extending Optical Transmission Distance in Fiber Wireless Links Using Passive Filtering in Conjunction with Optimized Modulation," Journal of Lightwave Technology, vol. 24, No. 4, Apr. 2006, 7 pages.

(56) References Cited

OTHER PUBLICATIONS

Bo Zhang et al., "Reconfigurable Multifunctional Operation Using Optical Injection-Locked Vertical-Cavity Surface-Emitting Lasers," Journal of Lightwave Technology, vol. 27, No. 15, Aug. 2009, 6 pages.

Chang-Hasnain, et al., "Ultrahigh-speed laser modulation by injection locking," Chapter 6, Optical Fiber Telecommunication V A: Components and Subsystems, Elsevier Inc., 2008, 20 pages.

Cheng Zhang et al., "60 GHz Millimeter-wave Generation by Two-mode Injection-locked Fabry-Perot Laser Using Second-Order Sideband Injection in Radio-over-Fiber System," Conference on Lasers and Electro-Optics and Quantum Electronics, Optical Society of America, May 2008, 2 pages.

Chrostowski, "Optical Injection Locking of Vertical Cavity Surface Emitting Lasers," Fall 2003, PhD dissertation University of California at Berkely, 122 pages.

Dang et al., "Radio-over-Fiber based architecture for seamless wireless indoor communication in the 60GHz band," Computer Communications, Elsevier B.V., Amsterdam, NL, vol. 30, Sep. 8, 2007, pp. 3598-3613.

Hyuk-Kee Sung et al., "Optical Single Sideband Modulation Using Strong Optical Injection-Locked Semiconductor Lasers," IEEE Photonics Technology Letters, vol. 19, No. 13, Jul. 1, 2007, 4 pages.

Lim et al., "Analysis of Optical Carrier-to-Sideband Ratio for Improving Transmission Performance in Fiber-Radio Links," IEEE Transactions of Microwave Theory and Techniques, vol. 54, No. 5, May 2006, 7 pages.

Lu H H et al., "Improvement of radio-on-multimode fiber systems based on light injection and optoelectronic feedback techniques," Optics Communications, vol. 266, No. 2, Elsevier B.V., Oct. 15, 2006, 4 pages.

Pleros et al., "A 60 GHz Radio-Over-Fiber Network Architecture for Seamless Communication With High Mobility," Journal of Lightwave Technology, vol. 27, No. 12, IEEE, Jun. 15, 2009, pp. 1957-1967.

Reza et al., "Degree-of-Polarization-Based PMD Monitoring for Subcarrier-Multiplexed Signals Via Equalized Carrier/Sideband Filtering," Journal of Lightwave Technology, vol. 22, No. 4, IEEE, Apr. 2004, 8 pages.

Zhao, "Optical Injection Locking on Vertical-Cavity Surface-Emitting Lasers (VCSELs): Physics and Applications," Fall 2008, PhD dissertation University of California at Berkeley, pp. 1-209.

Author Unknown, "VCSEL Chaotic Synchronization and Modulation Characteristics," Master's Thesis, Southwest Jiatong University, Professor Pan Wei, Apr. 2006, 8 pages. (machine translation).

Chowdhury et al., "Multi-service Multi-carrier Broadband MIMO Distributed Antenna Systems for In-building Optical Wireless Access," Presented at the 2010 Conference on Optical Fiber Communication and National Fiber Optic Engineers Conference, Mar. 21-25, 2010, San Diego, California, IEEE, pp. 1-3.

Patent Cooperation Treaty, International Search Report for PCT/IL2013/050671, Jan. 30, 2014, 3 pages.

\* cited by examiner

DISTRIBUTION OF TIME-DIVISION MULTIPLEXED (TDM) MANAGEMENT SERVICES IN A DISTRIBUTED ANTENNA SYSTEM, AND RELATED COMPONENTS, SYSTEMS, AND METHODS

PRIORITY APPLICATION

This application is a continuation of International Application No. PCT/IL13/050671 filed on Aug. 7, 2013 which claims the benefit of priority to U.S. Provisional Application No. 61/680,421 filed on Aug. 7, 2012, both applications being incorporated herein by reference.

BACKGROUND

Field of the Disclosure

The technology of the disclosure relates to distributed antenna systems configured to provide communications signals over a communications medium to and from one or more remote units for communicating with client devices.

Technical Background

Distributed antenna systems (DASs) are effective when deployed inside buildings or other environments where client devices may not otherwise receive radio-frequency (RF) signals from a base station or other source. DASs can be used to provide coverage for applications such as public safety, cellular telephony, wireless local access networks (LANs), location tracking, and medical telemetry inside buildings and over campuses. A typical DAS establishes a number of radio-frequency (RF) antenna coverage areas, also referred to as "antenna coverage areas." The antenna coverage areas are formed by remotely distributed antenna units (RAUs), which are sometimes referred to as remote units (RUs). A number of remote units are arranged to create an array of relatively small antenna coverage areas, with each RAU typically accommodating a small number of wireless client device users. This arrangement thus provides a uniform high quality signal and high throughput for wireless users.

DASs may be configured to distribute management signals in addition to RF communications signals. Management signals allow the central unit and remote units to communicate additional information without disturbing the RF communications services. Management signals include instructions for system operations, calibration information, gain control, alarm information, fault information, etc. DASs may combine management signals with RF communications signals to be communicated over the same communications medium for point to multi-point communications. For example, the RF communications signals may be at higher frequencies than the management signals that are modulated at a lower frequency or left in baseband, such that the RF communications signals do not interfere with the management signals. However, for point to multi-point communications, collisions will occur between management signals communicated to different remote units over a common communications medium at the same time. "Back-off" collision detection and avoidance systems can be employed to wait for a defined period of time until the communications medium is clear of other management signals before asserting new management signals on the communications medium. However, throughput is reduced to half-duplex as a result. Collision detection and management mechanism may also add design complexity, cost by requiring additional components, and require additional area on electronic boards.

SUMMARY OF THE DETAILED DESCRIPTION

According to a first embodiment, a central unit for providing communications signals and management signals in a distributed antenna system is configured to receive a plurality of downlink management signals from at least one management controller. The central unit is also configured to time-division multiplex (TDM) the plurality of downlink management signals into time slots of a designated remote unit among a plurality of remote units to form a TDM downlink management frame signal. The central unit is also configured to receive downlink RF communication signals of at least one RF communications frequency band for at least one RF communications service, and to combine the TDM downlink management frame signal with the downlink RF communication signals. The central unit is also configured to send the combined TDM downlink management frame signal and the downlink RF communications signals to the plurality of remote units over a downlink communications link. The central unit may also be configured to receive a plurality of combined uplink RF communications signals and TDM uplink management frame signals over an uplink communications link from each of the plurality of remote units for the at least one RF communications service.

In another embodiment, a method for providing communications signals comprises receiving a plurality of downlink management signals from at least one management controller. The method also comprises TDM of the plurality of downlink management signals into time slots of a designated remote unit among a plurality of remote units to form a TDM downlink management frame signal, receiving downlink RF communication signals of at least one RF communications frequency band for at least one RF communications service, combining the TDM downlink management frame signal with the downlink RF communication signals, sending the combined TDM downlink management frame signal and the downlink RF communications signals to the plurality of remote units over a downlink communications link, and receiving a plurality of combined uplink RF communications signals and TDM uplink management frame signals over an uplink communications link from each of the plurality of remote units for the at least one RF communications service.

In another embodiment, a remote unit for providing communications signals and management signals in a distributed antenna system is configured to receive a plurality of uplink management signals from at least one management controller. The remote unit is also configured to time-division multiplex (TDM) the plurality of uplink management signals into individual time slots to form a TDM uplink management frame signal, receive uplink RF communication signals of at least one RF communications frequency band for at least one RF communications service, combine the TDM uplink management frame signal with the uplink RF communication signals, and to send the combined TDM uplink management frame signal and the uplink RF communications signals to a central unit over an uplink communications link. The remote unit may also be configured to receive a plurality of combined downlink RF communications signals and TDM downlink management frame signals over a downlink communications link from the central unit for the at least one RF communications service.

In another embodiment, a method of providing communications signals comprises receiving a plurality of uplink management signals from at least one management controller, time-division multiplexing (TDM) the plurality of uplink management signals into individual time slots to form a TDM uplink management frame signal, receiving uplink RF communication signals of at least one RF communications frequency band for at least one RF communications service, combining the TDM uplink management frame signal with the uplink RF communication signals, sending the combined TDM uplink management frame signal and the uplink RF communication signals to a central unit over an uplink communications link, and receiving a plurality of combined downlink RF communications signals and TDM downlink management frame signals.

The distributed antenna system also includes the plurality of remote units. Each of the remote units is configured to receive a plurality of uplink management signals from a management controller, to time-division multiplex (TDM) the plurality of uplink management signals into individual time slots to form a TDM uplink management frame signal, to receive uplink RF communication signals of at least one RF communications frequency band for RF communications services, to combine the TDM uplink management frame signal with the uplink RF communication signals, and to send the combined TDM uplink management frame signal and the uplink RF communications signals to the at least one central unit over an uplink communications link. The remote unit may be further configured to receive combined downlink RF communications signals and TDM downlink management frame signals over a downlink communications link from the central unit.

The central units and remote units disclosed herein can be configured to support both RF communication services and digital data services. These communications services can be wired or wireless communications services that are typically communicated wirelessly, but may be provided over non-wireless medium (e.g., electrical conductor and/or optical fiber). The RF communication services and digital data services can be provided over any type of communications medium, including electrical conductors and optical fiber to wireless client devices, such as remote units for example. Examples of RF communications services are cellular services and radio communications services. Examples of digital data services include LAN using Ethernet, WLAN, WiMax, WiFi, Digital Subscriber Line (DSL), telephony, WCDMA, and LTE, which can support voice and data. Digital data signals can be provided over separate communications media for providing RF communication services, or over a common communications medium with RF communications signals.

Additional features and advantages will be set forth in the detailed description which follows, and in part will be readily apparent to those skilled in the art from that description or recognized by practicing the embodiments as described herein, including the detailed description that follows, the claims, as well as the appended drawings.

The foregoing general description and the following detailed description present embodiments, and are intended to provide an overview or framework for understanding the nature and character of the disclosure. The drawings are incorporated into and constitute a part of this specification. The drawings illustrate various embodiments, and together with the description serve to explain the principles and operation of the concepts disclosed.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Figure 1:
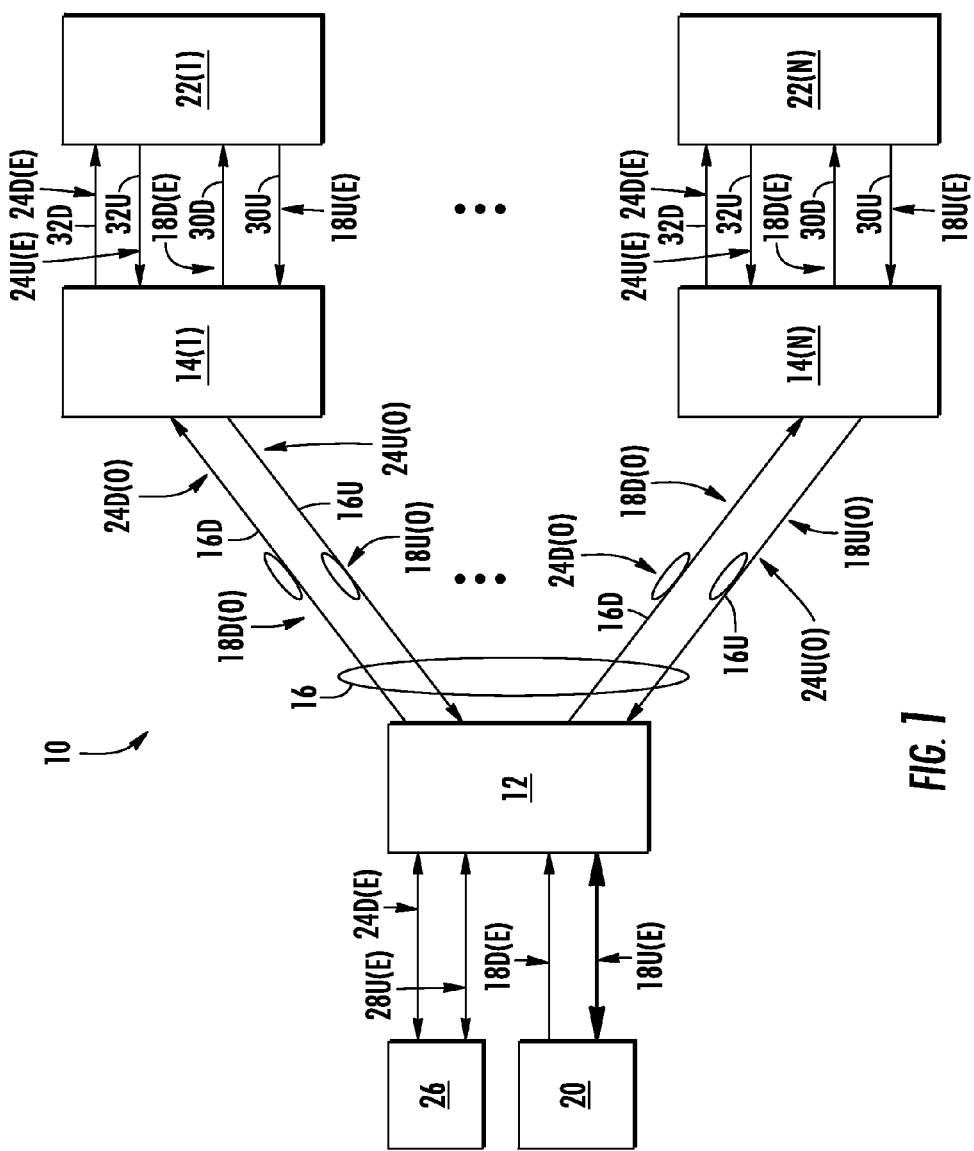
FIG. 1 is a schematic diagram of an exemplary point to multi-point optical fiber-based distributed antenna system configured to distribute RF communications services and management services.

Before discussing details of the particular components of the distributed antenna system 10 with regard to FIGS. 2-6, a general overview of the distributed antenna system 10, or DAS 10, in FIG. 1 is first provided. In this regard, the distributed antenna system 10 in FIG. 1 includes a central unit 12. The central unit 12 is communicatively coupled to one or more remote units 14(1)-14(N) via an optical fiber communications medium 16. Thus, in this example, the distributed antenna system 10 is an optical fiber-based distributed antenna system. However, the present disclosure is not limited to an optical fiber-based distributed antenna system. Other communications mediums including twisted pair conductors (e.g., CAT 5/6/7 cable) and coaxial cables could be employed or employed in conjunction with optical fiber. The distributed antenna system 10 is configured to distribute RF communications signals and management signals. In this regard, with regard to distribution of RF communications signals, the central unit 12 is configured to receive downlink RF communications signals 18D from a RF communications network, such as through a base station 20 as an example. In this embodiment, the downlink RF communications signals 18D are downlink electrical RF communications signals 18D(E). The downlink electrical RF communications signals 18D(E) can be combined and converted to downlink optical RF communications signals 18D(O) by the central unit 12 in this embodiment. The downlink optical RF communications signals 18D(O) are split and distributed by the central unit 12 over at least one downlink optical fiber 16D to each of the remote units 14(1)-14(N) to provide one or more RF communications services to the client devices 22(1)-22(N) in wired and/or wireless communication with the remote units 14(1)-14(N).

With continuing reference to FIG. 1, the remote units 14(1)-14(N) are convert the downlink optical RF communications signals 18D(O) back to downlink electrical RF communications signals 18D(E), and communicate the downlink electrical RF communications signals 18D(E) to one or more client devices 22(1)-22(N) to provide the one more RF communications services to the client devices 22(1)-22(N). The remote units 14(1)-14(N) can be configured to communicate through wired or wireless communications to the client devices 22(1)-22(N). For example, if the remote units 14(1)-14(N) are configured to be directly coupled to one client device 22(1)-22(N) each, up to 'N' client devices 22(1)-22(N) may be connected to the remote units 14(1)-14(N) in the DAS 10.

The remote units 14(1)-14(N) are also configured to receive uplink RF communications signals 18U from the client devices 22(1)-22(N) to be distributed to the central unit 12 and the base station(s) 20. The uplink RF communications signals 18U are received from the client devices 22(1)-22(N) as uplink electrical RF communications signals 18U(E), which are combined and converted to uplink optical RF communications signals 18U(O). The remote units 14(1)-14(N) distribute the uplink signals 18U(O) over at least one uplink optical fiber 16U to the central unit 12. The central unit 12 receives and converts the uplink optical RF communications signals 18U(O) back to uplink electrical RF communications signals 18U(E). The central unit 12 provides the uplink electrical RF communications signals 18U(E) to the base station(s) 20 to support the one or more RF communications services from the client devices 22(1)-22(N).

With continuing reference to FIG. 1, note that one common downlink optical fiber 16D may be provided between the central unit 12 and the remote units 14(1)-14(N) to carry downlink communications signals in a point-to-multipoint communications configuration. Similarly, one common uplink optical fiber 16U may be provided between the central unit 12 and the remote units 14(1)-14(N) to carry uplink communications signals in a point-to-multipoint communications configuration. Bi-directional communications in the downlink and uplink directions are provided in this embodiment of the DAS 10 in FIG. 1 by providing separate downlink optical fiber(s) 16D and uplink optical fiber(s) 16U. Further, due to the point-to-multipoint configuration of the DAS 10 in FIG. 1, the embodiments disclosed provide TDM of management signals distributed in the DAS 10 to ensure that the management signals do not interfere with providing bi-directional, full-duplex communications. Alternatively, individual downlink optical fibers 16D may be provided between the central unit 12 and each remote unit 14(1)-14(N) to carry downlink communications signals in a point-to-point communications configuration. The individual uplink optical fibers 16U may be provided between the central unit 12 and each remote unit 14(1)-14(N) to uplink communications signals in a point-to-point communications configuration.

As a further option, the downlink optical fiber 16D and uplink optical fiber 16U could be provided as a single optical fiber to carry both downlink and uplink signals. Time-division multiplexing of the downlink and uplink signals may be employed to allow the downlink and uplink signals to be communicated over a single optical fiber. Wave-division multiplexing (WDM), such as discussed in U.S. patent application Ser. No. 12/892,424 entitled "Providing Digital Data Services in Optical Fiber-based Distributed Radio Frequency (RF) Communications Systems, And Related Components and Methods," incorporated herein by reference in its entirety, may also be employed in this scenario to prevent collisions between downlink and uplink communications signals in the same or overlapping frequency bands. Further, U.S. patent application Ser. No. 12/892,424 also discloses distributed digital data communications signals in a distributed antenna system which may also be distributed in the DAS 10 either in conjunction with RF communications signals or not.

With reference back to FIG. 1, the central unit 12 of the DAS 10 is also configured to distribute management signals between one or more sources, such as between a management controller 26, and the remote units 14(1)-14(N). The management controller 26 may be a computer or console as non-limiting examples. For example, the management controller 26 may be configured to provide management signals to perform a variety of tasks or applications. Examples of management signals that may be distributed in the distributed antenna system 10 include configuration signals, control signals, gain control signals, monitoring signals, and configuration signals, fault signals, and alarm signals. The management signals are not for providing RF communications services between the base station(s) 20 and the client devices 22(1)-22(N). The management signals may be communicated according to any protocol desired, such as the Ethernet protocol.

The central unit 12 is configured to receive downlink management signals 24D from the management controller 26. The central unit 12 distributes the downlink management signals 24D to the remote units 14(1)-14(N) to be distributed to the client devices 22(1)-22(N) communicatively coupled to the remote units 14(1)-14(N). The management controller 26 provides downlink management signals 24D to be distributed by the central unit 12 to any number of remote units 14(1)-14(N). Thus, to prevent the downlink management signals 24D destined for different remote units 14(1)-14(N) from interfering with each other, the central unit 12 time-division multiplexes the downlink electrical management signals 24D(E) into individual time slots in a downlink TDM management frame signal to be distributed to the remote units 14(1)-14(N). The central unit 12 converts the downlink TDM electrical management signal to downlink TDM optical management signals 24D(O) to be distributed over the at least one downlink optical fiber 16D to the remote units 14(1)-14(N) and the client devices 22(1)-22(N) in this embodiment. The central unit 12 can be configured to either broadcast all downlink electrical management signals 24D(E) to all remote units 14(1)-14(N), or provide specific downlink electrical management signals 24D(E) to individual remote units 14(1)-14(N).

In this embodiment, as will be described in more detail below, the downlink TDM optical management signals 24D(O) are combined with the downlink optical RF communications signals 18D(O) in different frequency bands and distributed over the same downlink optical fiber 16D. The remote units 14(1)-14(N) are configured to receive and convert downlink TDM optical management signals 24D(O) to downlink TDM electrical management signals, which can then be parsed by each remote unit 14(1)-14(N) to receive a particular downlink electrical management signal 24D(E) destined for the remote unit 14(1)-14(N).

The remote units 14(1)-14(N) are also configured to create and provide uplink management signals 24U be distributed to the central unit 12 and the management controller 26. For example, it may be desired for the remote units 14(1)-14(N) to have the ability to provide the same type of management signals described above to the central unit 12, which are not related to RF communication services provided to the base station(s) 20. In this regard, uplink electrical management signals 24U(E) may be provided by the client devices 22(1)-22(N) to the remote units 14(1)-14(N). The remote units 14(1)-14(N) time-division multiple the uplink electrical management signals 24U(E) into individual time slots in an uplink TDM electrical management frame signal. Thus, the management signals received by the central unit 12 from different remote units (1)-14(N) do not interfere with each other. The remote units 14(1)-14(N) combine the received uplink TDM electrical management signals with uplink electrical RF communications signals 18U(E), and then configured to convert the combined uplink TDM electrical management signals and uplink electrical RF communications signals 18U(E) to combined uplink TDM optical management signals 24U(O) and uplink optical RF communications signals 18U(O) to be distributed over the at least one uplink optical fiber 16U to the central unit 12.

With continuing reference to FIG. 1, the central unit 12 is configured to convert the received combined uplink TDM optical management signals 24U(O) and uplink optical RF communications signal 18U(O) into combined uplink TDM electrical management signals 24U(E) and uplink electrical RF communications signal 18U(E). The central unit 12 then splits the uplink TDM electrical management signals 24U(E) from the uplink electrical RF communications signal 18U(E). The central unit 12 is configured to translate the uplink TDM electrical management signals 24U(E) into individual uplink electrical management signals 28U(E) from the different remote units 14(1)-14(N) and provide the uplink electrical management signals 28U(E) to the management controller(s) 26.

With continuing reference to FIG. 1, the remote units 14(1)-14(N) in the DAS 10 are communicatively coupled to the client devices 22(1)-22(N) by a separate electrical RF communications medium 30 and an electrical management communications medium 32. In this embodiment, the electrical RF communications medium 30 includes a separate downlink electrical RF communications medium 30D and an uplink electrical RF communications medium 30U. Alternatively, the downlink electrical RF communications medium 30D and uplink electrical RF communications medium 30D may be provided as a single electrical RF communications medium that carries both downlink and uplink RF communications signals. The electrical management communications medium 32 in FIG. 1 also includes a separate downlink electrical management communications medium 32D and an uplink electrical management communications medium 32U. Alternatively, the downlink electrical management communications medium 32D and the uplink electrical management communications medium 32U may be provided as a single management communications medium that carries both downlink and uplink management communications signals. The electrical management communications mediums 30, 32 may be coaxial cables, for example.

Figure 2:
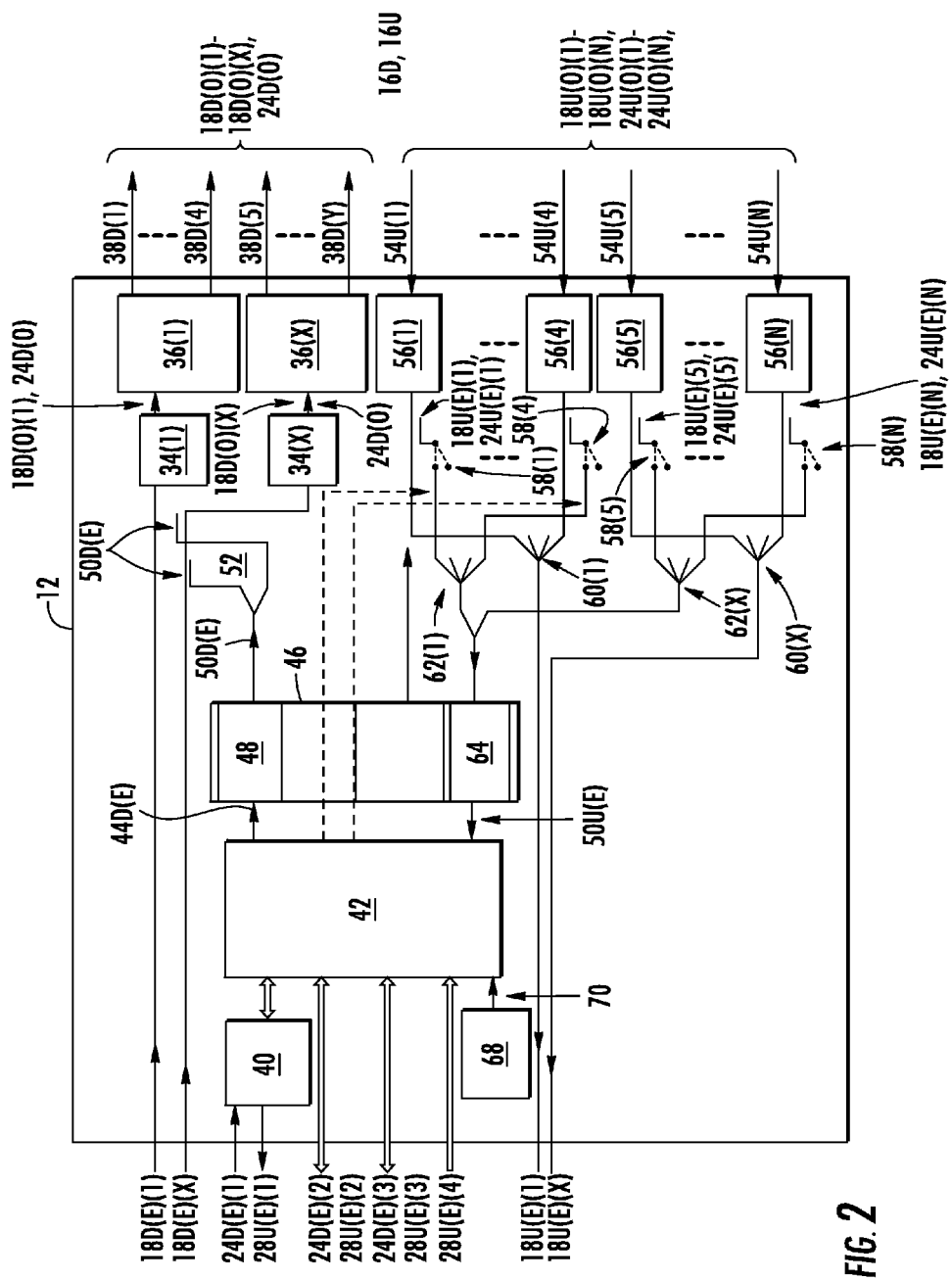
FIG. 2 is a schematic diagram of an exemplary central unit that can be employed in the optical fiber-based distributed antenna system in FIG. 3 for supporting distribution of RF communications services and management services to remote units in a point to multi-point configuration.

FIG. 2 is a schematic diagram of the central unit 12 in the distributed antenna system 10 in FIG. 1 to explain exemplary components provided therein in more detail. As illustrated in FIG. 2, in the downlink direction, a plurality of downlink electrical RF communications signals 18D(E)(1)-18D(E)(X) are received by the central unit 12, wherein 'X' signifies any number of signals. To convert the downlink electrical RF communications signals 18D(E)(1)-18D(E)(X) to optical RF communications signals, the laser diodes 34(1)-34(X) are provided. The laser diodes 34(1)-34(X) convert the downlink electrical RF communications signals 18D(E)(1)-18D(E)(X) into downlink optical RF communications signals 18D(O)(1)-18D(O)(X) to be communicated over the downlink optical fiber 16D. The downlink optical RF communications signals 18D(O)(1)-18D(O)(X) are split by optical splitters 36(1)-36(X), which are 1×4 splitters in this example, into 'Y' number of downlink optical RF communications channels 38D(1)-38D(Y). Each of the downlink optical RF communications channels 38D(1)-38D(Y) contains the downlink optical RF communications signals 18D(O)(1)-18D(O)(X). The downlink optical RF communications signals 18D(O)(1)-18D(O)(X) are split into the downlink optical RF communications channels 38D(1)-38D(Y) to provide each of the downlink optical RF communications signals 18D(O)(1)-18D(O)(X) to the remote units 14(1)-14(N).

A downlink electrical management signal 24D(E)(1), which is an Ethernet protocol management signal in this example, is received by the central unit 12 to be distributed to the remote units 14(1)-14(N). The downlink electrical management signal 24D(E)(1) is received in an Ethernet physical layer (PHY) circuit 40. The Ethernet PHY circuit 40 provides the downlink electrical management signal 24D(E)(1) to a media access controller 42 for processing before being distributed to the remote units 14(1)-14(N). The media access controller 42 translates and synchronizes the unsynchronized downlink electrical management signal 24D(E)(1) to a synchronized management signal. The media access controller 42 may be provided as a field programmable gate array (FPGA), ASIC, microprocessor or microcontroller, as non-limiting examples.

For example, FIGS. 3A and 3B are timing diagrams of an Ethernet protocol downlink electrical management signal 24D(E) before and after being synchronized, respectively. As illustrated in FIG. 3A, the downlink electrical management signal 24D(E) is provided as an Ethernet protocol signal, which may be a 10 Megabits per second (Mbps) signal as a non-limiting example. To create a synchronized downlink electrical management signal 24D(E) as provided in FIG. 3B, control symbols 43 are provided in the form of a time-divisional domain (TDD) receive symbol 43(1), a start symbol 43(2), a TDD transmit symbol 43(3), and an end symbol 43(4). Receive data 45(1) is inserted between start symbol 43(2) and the TDD transmit symbol 43(3). Transmit data 45(2) is inserted between the TDD transmit symbol 43(3) and the end symbol 43(4).

Figure 4:
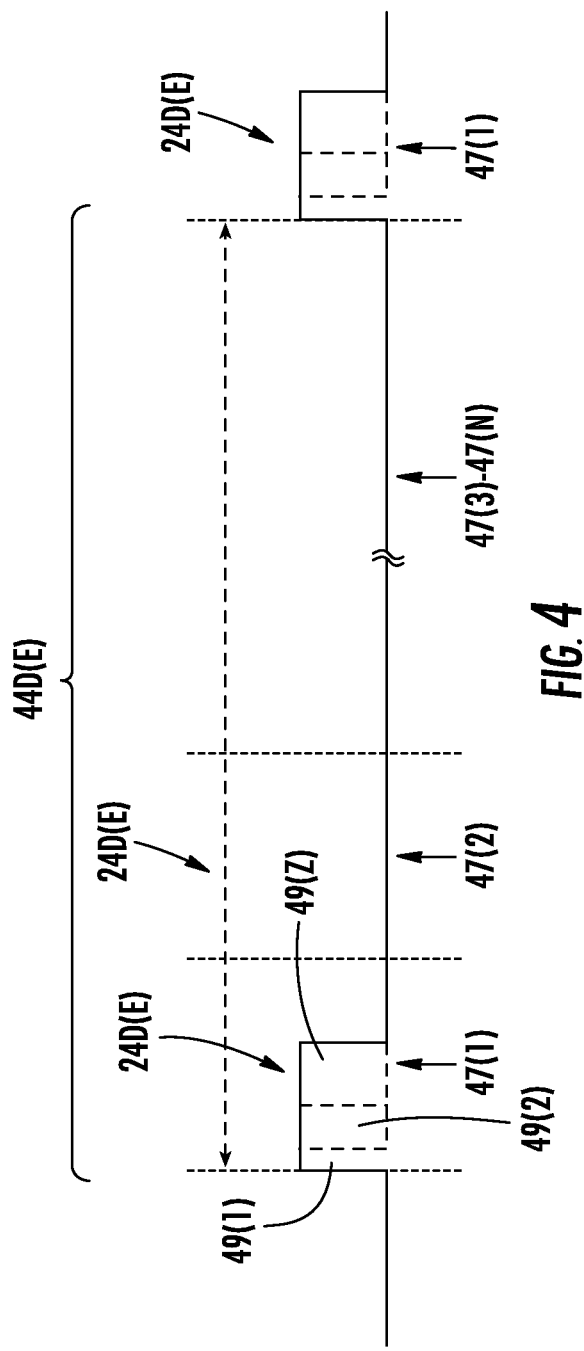
FIG. 4 is an exemplary multi-frame timing diagram of a synchronous, time-division multiplexed management frame signal communicated in the distributed antenna system of FIG. 1.

Referring back to FIG. 2, the media access controller 42 inserts the synchronized downlink electrical management signal 24D(E)(1) into a downlink electrical TDM management frame along with additional downlink control management signals 24D(E)(2), 24D(E)(3) from other sources, such as general purpose input-output (GPIO) fast signals (e.g., TDD, RS232) and GPIO slow signals, to provide a downlink electrical TDM management frame signal 44D(E). Downlink control signals may also include downlink configuration control management signals 24D(E)(4) as another example. FIG. 4 is an exemplary timing diagram of the downlink electrical TDM management frame signal 44D(E). As illustrated in FIG. 4, the synchronized downlink electrical management signals 24D(E) destined for particular remote units 14(1)-14(N) (shown in FIG. 1) are inserted into a time slot 47 corresponding to the remote unit 14(1)-14(N). For example, time slot 1 47(1) may correspond to remote unit 14(1). Time slot 2 47(2) may correspond to remote unit 14(2), and so on. Each time slot 47 can be split into several sub-slots 49(1)-49(Z), wherein one sub-slot 49 is used for transferring translated management packets, and the other sub-slots 49 are used for transferring other management control signals, such as additional downlink control management signals 24D(E)(2)-24D(E)(4). Each time slot 47 can be controlled to be fixed in size or variable in size depending on the bandwidth needs of the remote unit 14(1)-14(N) corresponding to the time slot 47. Also, some time slots 47 may not be required if there are not management signals for particular remote units 14(1)-14(N), which can allow this additional bandwidth to be used to vary the size of other used time slots 47. The remote units 14(1)-14(N) can parse the received downlink electrical TDM management frame signal 44D(E) to retrieve management signals for the particular remote unit 14(1)-14(N).

With reference back to FIG. 2, the downlink electrical TDM management frame signal 44D(E) is provided to a transceiver circuit 46 to be modulated by modulator 48 over an RF carrier frequency (e.g., between 2500-3000 MHz). In this manner, the transceiver circuit 46 may be configured to receive I-Q signals or single stream signal, as examples. Modulating the downlink electrical TDM management frame signal 44D(E) is optional. Modulating the downlink electrical TDM management frame signal 44D(E) may be desired to provide the downlink electrical TDM management frame signal 44D(E) in a frequency band (e.g., 2700-2900 MHz) that is different, but closer to the frequency band of the downlink electrical RF communications signals 18D(E)(1)-18D(E)(X) than a baseband or a lower modulation frequency to allow the same laser diodes 34(1)-34(X) to operate in their linear range to be used to convert the combined signal into an optical signal. This can save cost in avoiding dedicated laser diodes for converting downlink electrical TDM management frame signal 44D(E) and the downlink electrical RF communications signals 18D(E)(1)-18D(E)(X) into optical signals. In this regard, the modulated downlink electrical TDM management frame signal 50D(E) is split by splitter 52 and combined with the downlink electrical RF communications signals 18D(E)(1)-18D(E)(X). The corresponding plurality of combined downlink electrical RF communications signals 18D(E)(1)-18D(E)(X) and downlink electrical TDM management frame signal 50D(E) are each provided to the corresponding laser diode 34(1)-34(X) to be converted into a plurality of combined downlink optical RF communications signals 18D(O)(1)-18D(O)(X) and downlink electrical TDM management frame signal 24D(O), respectively.

Figure 5:
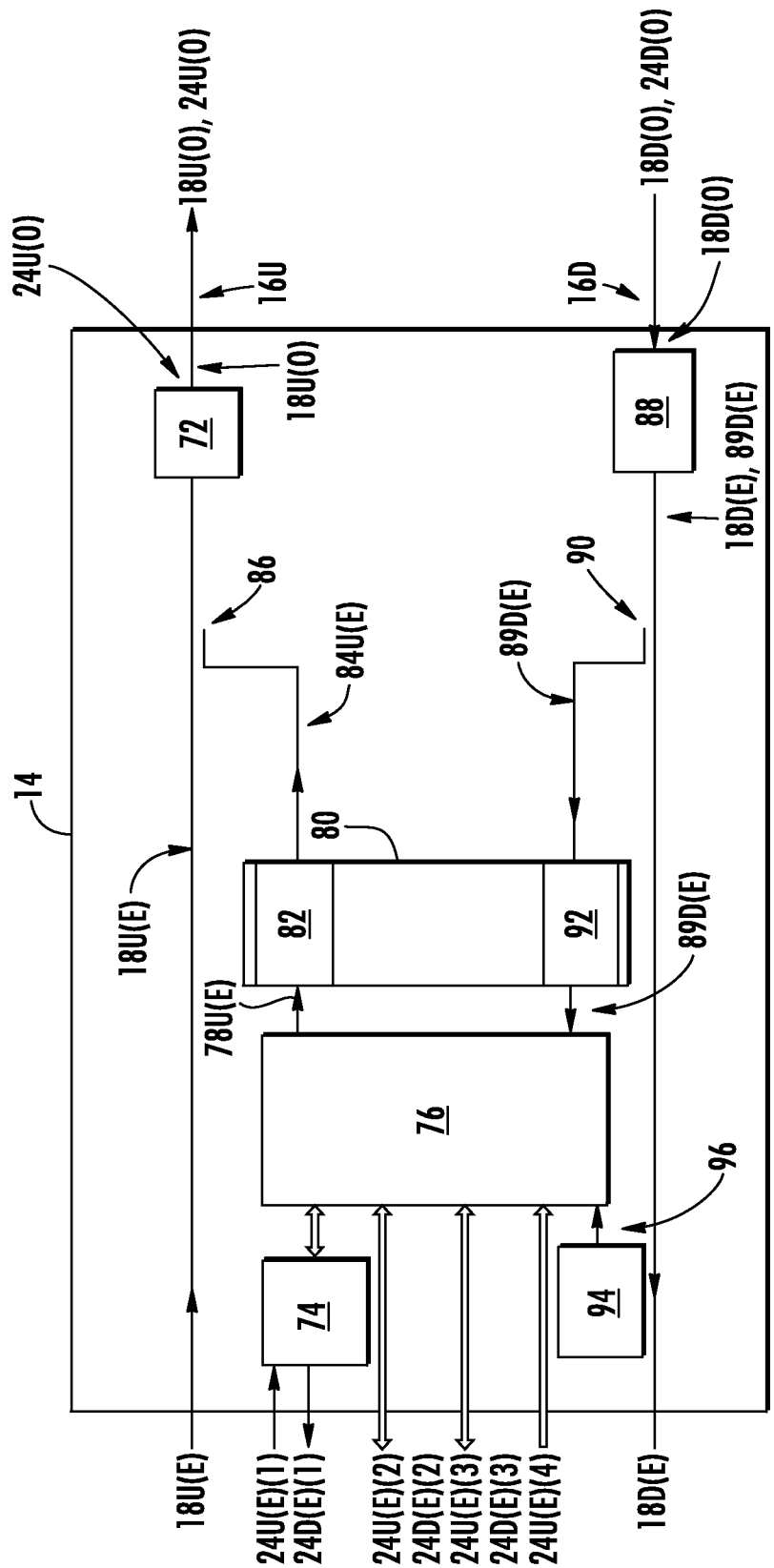
FIG. 5 is a schematic diagram of an exemplary remote unit that can be employed in the distributed antenna system in FIG. 1.

With continuing reference to FIG. 2, the plurality of combined downlink optical RF communications signals 18D(O)(1)-18D(O)(X) and downlink optical TDM management frame signals 24D(O) are each provided to optical splitters 36(1)-36(X). The optical splitters 36(1)-36(X) split the combined downlink optical RF communications signals 18D(O)(1)-18D(O)(X) and downlink optical TDM management frame signals 24D(O) into multiple downlink optical RF communications channels 38D(1)-38D(Y) to be distributed over the downlink optical fiber 16D to the remote units 14(1)-14(N). In this manner, each of the remote units 14(1)-14(N) receive the downlink optical RF communications signals 18D(O)(1)-18D(O)(X) and downlink optical TDM management frame signals 24D(O). FIG. 5, described in more detail below, discusses the processing of the received downlink optical RF communications signals 18D(O)(1)-18D(O)(X) and downlink optical TDM management frame signals 24D(O) by the remote units 14(1)-14(N).

In the uplink direction, each combined pair of uplink optical RF communications signals 18U(O)(1)-18U(O)(N) and uplink optical TDM management frame signals 24U(O)(1)-24U(O)(N) are received by the central unit 12 over separate channels 54U(1)-54U(N) from the remote units 14(1)-14(N). Each combined pair of uplink optical RF communications signals 18U(O)(1)-18U(O)(N) and uplink optical TDM management frame signals 24U(O)(1)-24U(O)(N) is provided to separate photodiodes 56(1)-56(N). The photodiodes 56(1)-56(N) convert each of the combined pairs of uplink optical RF communications signals 18U(O)(1)-18U(O)(N) and uplink optical TDM management frame signals 24U(O)(1)-24U(O)(N), into combined pairs of uplink electrical RF communications signals 18U(E)(1)-18U(E)(N) and uplink electrical TDM management frame signals 24U(E)(1)-24U(E)(N). The combined pairs of uplink electrical RF communications signals 18U(E)(1)-18U(E)(N) and uplink electrical TDM management frame signals 24U(E)(1)-24U(E)(N) are split by splitters 58(1)-58(N) to split the uplink electrical RF communications signals 18U(E)(1)-18U(E)(N) from the uplink electrical TDM management frame signals 24U(E)(1)-24U(E)(N). Then, each of the uplink electrical RF communications signals 18U(E)(1)-18U(E)(N) is combined by combiners 60(1)-60(X) to provide combined uplink electrical RF communications signals 18U(E)(1)-18U(E)(X) to be delivered to the base station(s) 20.

Each of the uplink electrical TDM management frame signals 24U(E)(1)-24U(E)(N) are combined by combiners 62(1)-62(X) to provide a combined uplink electrical TDM management frame signal 24U(E). The combined uplink electrical TDM management frame signal 24U(E) is provided to a demodulator 64 in the transceiver 46. The demodulator 64 demodulates the combined uplink electrical TDM management frame signal 24U(E) from its RF carrier and delivers the demodulated uplink electrical TDM management frame signal 24U(E) to the media access controller 42. The media access controller 42 translates the demodulated uplink electrical TDM management frame signal 24U(E) to a standard, desired protocol (e.g., Ethernet protocol) and also retrieves other control signals included therein, such as GPIO fast signals 28U(E)(2) and GPIO slow signals 28U(E)(3). The central unit 12 includes a references oscillator 68 that provides a reference signal 70 to be used by the media access controller 42 to translate the downlink electrical TDM management frame signal 24D(E) and demodulated uplink electrical TDM management frame signal 24U(E).

Figure 3:
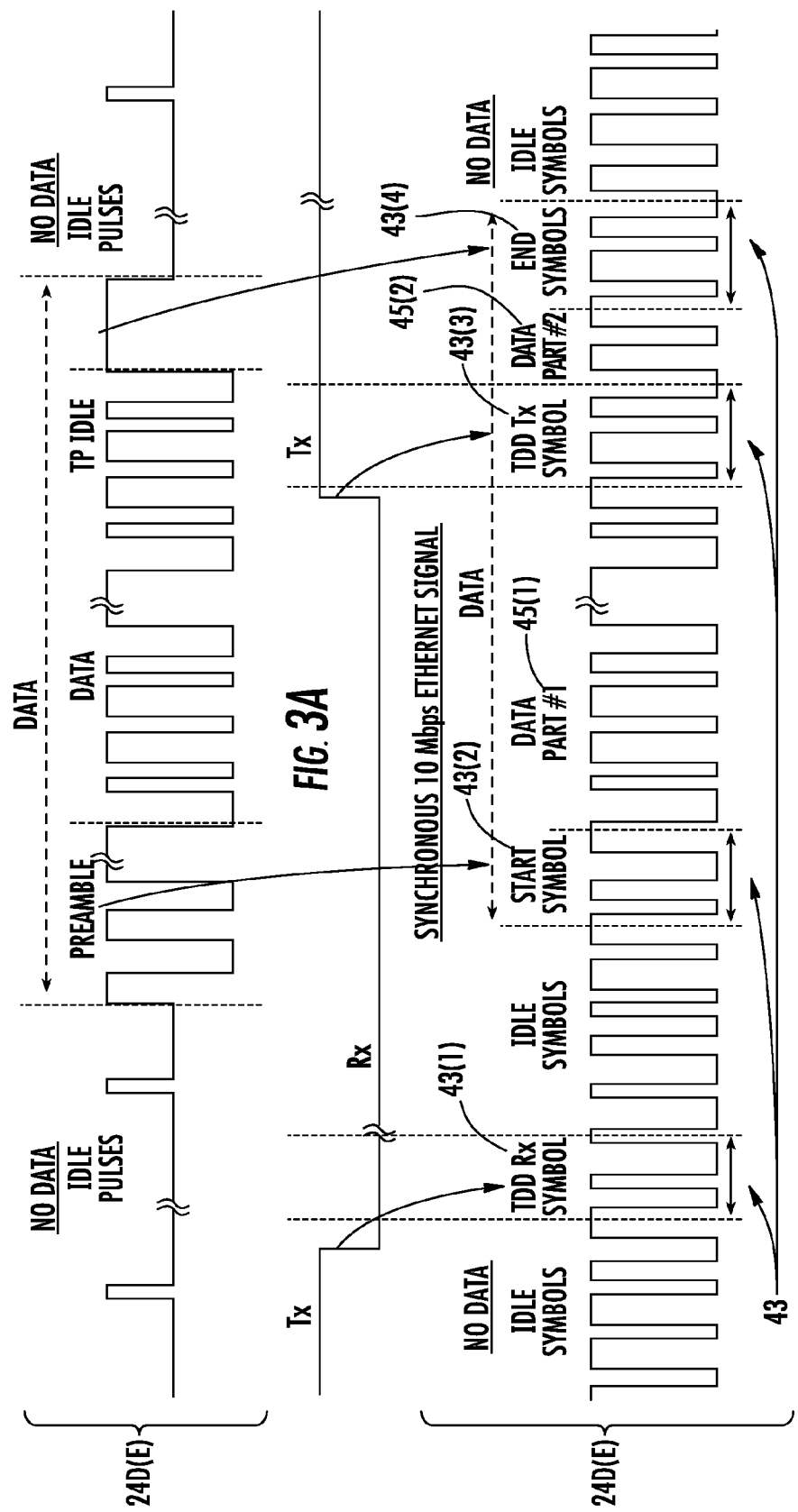
FIGS. 3A and 3B are exemplary timing diagrams of a management signal communicated in the distributed antenna system of FIG. 1 before and after being synchronized, respectively.

FIG. 5 is a schematic diagram of a remote unit 14 in the DAS 10 in FIG. 1 to explain certain components therein in more detail. Only one remote unit 14 is illustrated in FIG. 5, but note that the remote unit 14 in FIG. 5 can be provided as any of the remote units 14(1)-14(N) in the DAS 10 of FIG. 1. As illustrated in FIG. 3, in the uplink direction, an uplink electrical RF communications signal 18U(E) is received by the remote unit 14. To convert the uplink electrical RF communications signal 18U(E) to an optical RF communications signal, a laser diode 72 is provided. The laser diode 72 converts the uplink electrical RF communications signal 18U(E) into an uplink optical RF communications signal 18U(O) to be communicated over the uplink optical fiber 16U to the central unit 12.

With continuing reference to FIG. 5, an uplink electrical management signal 24U(E)(1), which is an Ethernet protocol management signal in this example, is received by the remote unit 14 to be distributed to the central unit 12. The uplink electrical management signal 24U(E)(1) is received in an Ethernet physical layer (PHY) circuit 74. The Ethernet PHY circuit 74 provides the uplink electrical management signal 24U(E)(1) to a media access controller 76 for processing before being distributed to the central unit 12. The media access controller 76 translates and synchronizes the unsynchronized uplink electrical management signal 24U(E)(1) to a synchronized protocol. The media access controller 76 inserts the synchronized uplink electrical management signal 24U(E)(1) into an uplink electrical TDM management frame along with additional uplink control management signals 24U(E)(2), 24U(E)(3) from other sources, such as general purpose input-output (GPIO) fast signals (e.g., TDD, RS232) and GPIO slow signals, to provide an uplink electrical TDM management frame signal 78U(E). The media access controller 76 may be provided as a field programmable gate array (FPGA), ASIC, microprocessor or micro-controller, as non-limiting examples.

With continuing reference to FIG. 5, the uplink electrical TDM management frame signal 78U(E) is provided to a transceiver circuit 80 to be modulated by modulator 82 over an RF carrier frequency (e.g., 2500-3000 MHz). The transceiver circuit 80 may be configured to receive I-Q signals or single stream signal, as examples. Modulating the uplink electrical TDM management frame signal 78U(E) is optional. Modulating the uplink electrical TDM management frame signal 78U(E) may be desired to provide the uplink electrical TDM management frame signal 78U(E) to be closer in frequency band to the uplink electrical RF communications signal 18U(E) (e.g., within 2700-2900 MHz) than baseband or a low frequency carrier to allow the laser diode 72 to operate in its linear range to convert the combined signal into an optical signal. In this regard, the modulated uplink electrical TDM management frame signal 84U(E) is combined with the uplink electrical RF communications signal 18U(E) by combiner 86. The combined uplink electrical RF communications signal 18U(E) and uplink electrical TDM management frame signal 78U(E) is provided to the laser diode 72 to be converted into a combined uplink optical RF communications signals 18U(O) and uplink optical TDM management frame signal 24U(O). The combined uplink optical RF communications signals 18U(O) and uplink optical TDM management frame signal 24U(O) is communicated over the uplink optical fiber 16U to the central unit 12.

In the downlink direction, a combined downlink optical RF communications signal 18D(O) and downlink optical TDM management frame signal 24D(O) is received by the remote unit 14 from the central unit 12. The combined downlink optical RF communications signal 18D(O) and downlink optical TDM management frame signal 24D(O) is provided to a photodiode 88. The photodiode 88 converts the combined downlink optical RF communications signal 18D(O) and downlink optical TDM management frame signal 24D(O), into a combined downlink electrical RF communications signal 18D(E) and downlink electrical TDM management frame signal 89D(E). The combined downlink electrical RF communications signal 18D(E) and downlink electrical TDM management frame signal 89D(E) are split by splitter 90 to split the downlink electrical RF communications signal 18D(E) from the downlink electrical TDM management frame signal 89D(E). The downlink electrical RF communications signal 18D(E) is delivered to the client device(s) 22.

The downlink electrical TDM management frame signal 89D(E) is provided to a demodulator 92 in the transceiver circuit 80. The demodulator 92 demodulates the downlink electrical TDM management frame signal 89D(E) from its RF carrier and delivers the demodulated downlink electrical TDM management frame signal 24D(E) to the media access controller 76. The media access controller 76 translates the demodulated uplink electrical TDM management frame signal 24D(E) to a standard, desired protocol (e.g., Ethernet protocol) and also retrieves other control signals included therein, such as GPIO fast signals 24U(E)(2) and GPIO slow signals 24U(E)(3). The remote unit 14 includes a reference oscillator 94 that provides a reference signal 96 to be used by the media access controller 76 to translate the demodulated downlink electrical TDM management frame signal 24D(E) and uplink electrical TDM management frame signal 24U(E).

Figure 6:
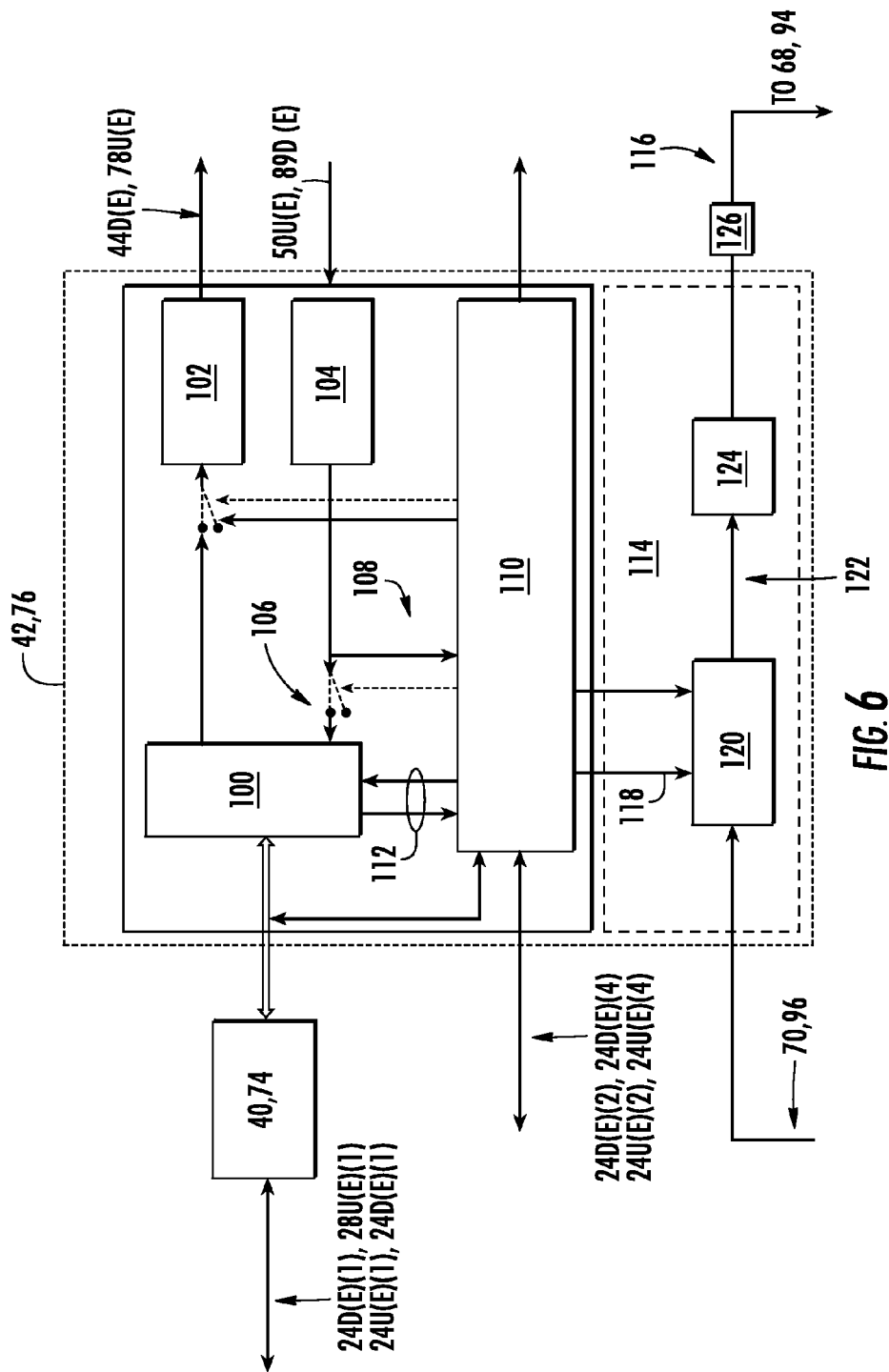
FIG. 6 is a schematic diagram illustrating more detail of an exemplary physical layer (PHY) circuit that may be employed in the central unit in FIG. 2 and the remote unit in FIG. 5.

FIG. 6 is a schematic diagram illustrating more exemplary detail of the exemplary media access controllers 42, 76 employed in the central unit 12 in FIG. 2 and the remote unit 14 in FIG. 5. A first in, first out (FIFO) buffer 100 is provided to store management signals received and transmitted. A Manchester encoder 102 is provided to encode the downlink electrical TDM management frame signal 44D(E) and the uplink electrical TDM management frame signal 78U(E). A Manchester decoder 104 is provided to decode the modulated downlink electrical TDM management frame signal 50D(E) and the downlink electrical TDM management frame signal 89D(E) into individual electrical management signals 106. The electrical management signals 106 are provided to the FIFO buffer 100. Control signals 108 embedded in the modulated downlink electrical TDM management frame signal 50D(E) and the downlink electrical TDM management frame signal 89D(E) are provided to a main control module 110 that controls the injection and extraction of timing, control, and signaling symbols when translating and de-translating management signals. The main control module 110 also controls the timing of the latching of signals in and out of the FIFO buffer 100 according to control signals 112.

The media access controllers 42, 76 also include a digital phase locked loop (PLL) circuit 114. The PLL circuit 114 phase locks the reference signals 70, 96 by sending control voltage signals 116 to the oscillators 68, 94. The reference signals 70, 96 are used by the management control module 110 to control the translation (e.g., sampling) of the management signals, as discussed above. The management control module 110 provides a clock recovery signal 118 extracted from management signals to the phase detector 120. The phase detector 120 compares the reference signals 70, 96 to output a phase difference signal 122 to a digital-to-analog converter 124 and low pass filter 126 to generate the control voltage signal 116 to control the oscillators 68, 94 to phase control the reference signals 70, 96 according to the clock recovery signal 118.

Note that downlink optical fiber 16D and uplink optical fiber 16U could be provided as a single optical fiber to carry combined downlink optical RF communications signals 18D(O)(1)-18D(O)(X), downlink electrical TDM management frame signal 24D(O), uplink TDM optical management signals 24U(O), and uplink optical RF communications signals 18U(O). Time-division multiplexing of the downlink and uplink signals may be employed to allow these downlink and uplink signals to be communicated over a single optical fiber. Wave-division multiplexing (WDM), such as discussed in U.S. patent application Ser. No. 12/892,424, incorporated herein by reference in its entirety, may also be employed in this scenario to prevent collisions between downlink and uplink communications signals in the same or overlapping frequency bands.

The RF communications services supported by the distributed antenna systems disclosed in this application, such as the DAS 10 may include, but are not limited to, US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink), medical telemetry frequencies, WLAN, WiMax, WiFi, Digital Subscriber Line (DSL), and LTE, etc.

Figure 7:
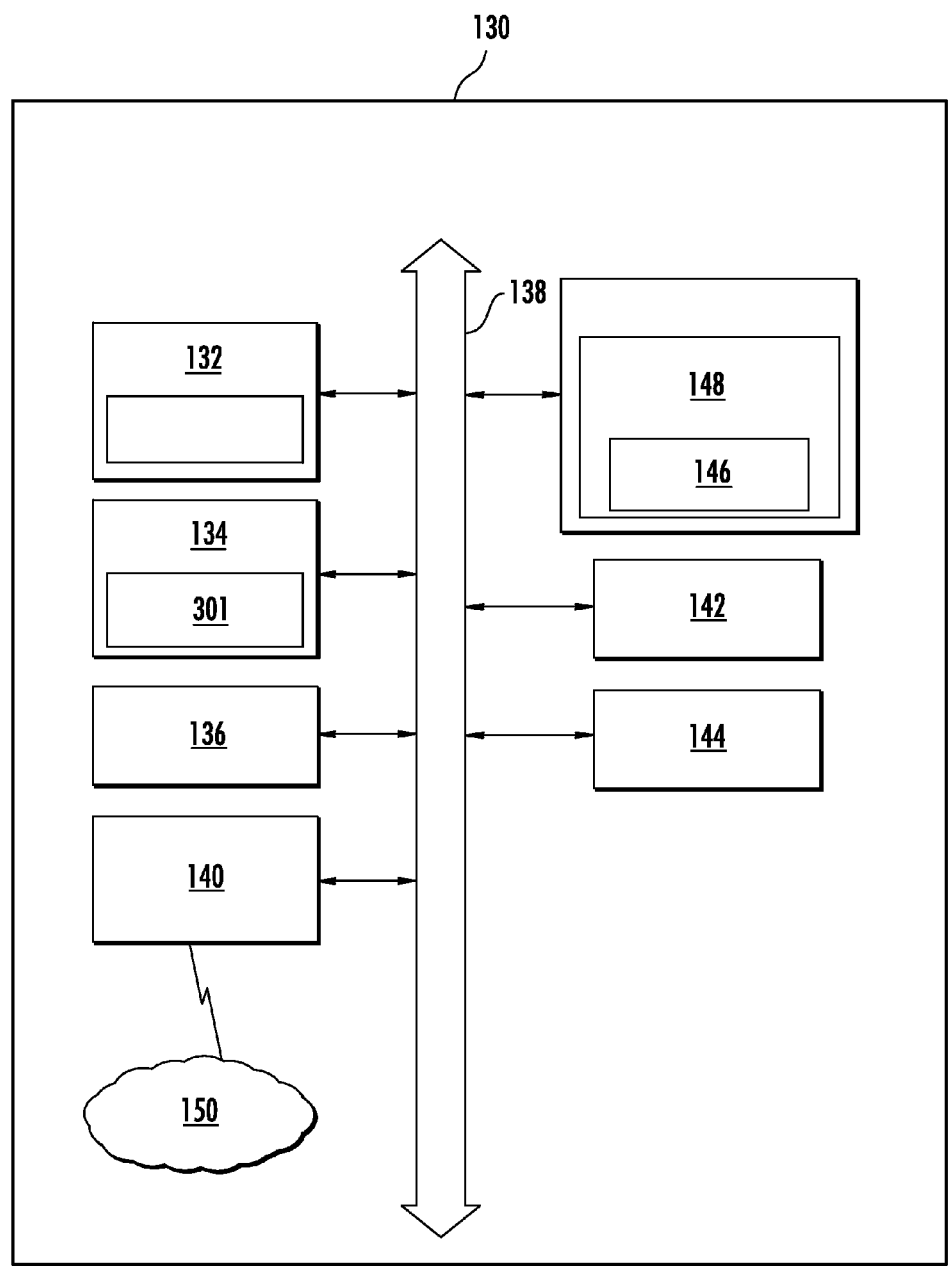
FIG. 7 is a schematic diagram of a generalized representation of an exemplary computer system that can be included in or interface with any of the RFIC chips provided in the exemplary distributed antenna systems and/or their components described herein.

Any of the DAS components disclosed herein can include a computer system. In this regard, FIG. 7 is a schematic diagram representation of additional detail regarding an exemplary form of a computer system 130 that is adapted to execute instructions from a computer-readable medium to perform power management functions and can be included in a distributed antenna system component(s). The computer system 130 includes a set of instructions for causing the distributed antenna system component(s) to provide its designed functionality. The DAS component(s) may be connected (e.g., networked) to other machines in a LAN, an intranet, an extranet, or the Internet. The DAS component(s) may operate in a client-server network environment, or as a peer machine in a peer-to-peer (or distributed) network environment. While only a single device is illustrated, the term "device" shall also include any collection of devices that individually or jointly execute a set (or multiple sets) of instructions to perform any one or more of the methodologies discussed herein. The DAS component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server or a user's computer. The exemplary computer system 130 in this embodiment includes a processing device or processor 132, a main memory 134 (e.g., read-only memory (ROM), flash memory, dynamic random access memory (DRAM) such as synchronous DRAM (SDRAM), etc.), and a static memory 136 (e.g., flash memory, static random access memory (SRAM), etc.), which may communicate with each other via the data bus 138. Alternatively, the processing device 132 may be connected to the main memory 134 and/or static memory 136 directly or via some other connectivity means. The processing device 132 may be a controller, and the main memory 134 or static memory 136 may be any type of memory.

The processing device 132 represents one or more general-purpose processing devices such as a microprocessor, central processing unit, or the like. More particularly, the processing device 132 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 132 is configured to execute processing logic in instructions 301 for performing the operations and steps discussed herein.

The computer system 130 may further include a network interface device 140. The computer system 130 also may or may not include an input 142 to receive input and selections to be communicated to the computer system 130 when executing instructions. The computer system 130 also may or may not include an output 144, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 130 may or may not include a data storage device that includes instructions 146 stored in a computer-readable medium 148. The instructions 146 may also reside, completely or at least partially, within the main memory 134 and/or within the processing device 132 during execution thereof by the computer system 130, the main memory 134 and the processing device 132 also constituting computer-readable medium. The instructions 146 may further be transmitted or received over a network 150 via the network interface device 140.

While the computer-readable medium 148 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical and magnetic medium, and carrier wave signals.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. Storage media may be coupled to the processor such that the processor can read information from, and write information to, the storage medium, or integral to the processor. The processor and the storage medium may reside in an ASIC. The ASIC may reside in a remote station as discrete components in a remote station, base station, or server.

As used herein, the terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers.

We claim:

1. A central unit for providing communications signals and management signals in a distributed antenna system and comprising a media access controller in communication with a transceiver circuit, the central unit being configured to:
   receive a plurality of downlink management signals from at least one management controller for distribution to a respective plurality of remote units;
   time-division multiplex (TDM) the plurality of downlink management signals into time slots of the respective plurality of remote units to form a TDM downlink management frame signal;
   receive downlink radio frequency (RF) communication signals of at least one RF-communications frequency band for at least one RF communications service;
   combine the TDM downlink management frame signal with the downlink RF communication signals;
   send the combined TDM downlink management frame signal and the downlink RF communications signals to the respective plurality of remote units over a downlink communications link, wherein the plurality of downlink management signals includes at least one of a configuration management signal, a gain control signal, a status signal, an alarm signal, and a fault signal, and wherein at least a portion of the downlink communications link is comprised of at least one downlink optical fiber; and
   modulate the TDM downlink management frame signal in a management services frequency band different from the at least one RF communications frequency band, wherein the central unit comprises at least one electrical-to-optical converter configured to convert the combined TDM downlink management frame signal and the downlink RF communication signals into a combined TDM downlink optical management frame signal and downlink optical RF communications signals.

2. The central unit of claim 1, further configured to synchronize the plurality of downlink management signals.

3. The central unit of claim 1, wherein the TDM downlink management frame signal is comprised of Ethernet protocol signals.

4. The central unit of claim 1, wherein the management services frequency band above 2500 MegaHertz (MHz).

5. The central unit of claim 1, further comprising a transceiver configured to modulate the TDM downlink management frame signal in the management services frequency band.

6. The central unit of claim 1, wherein at least a portion of the downlink communications link is comprised of at least one downlink coaxial cable.

7. The central unit of claim 1, further comprising an optical splitter configured to split the combined TDM downlink optical management frame signal and the downlink optical RF communications signals into a plurality of combined TDM downlink optical management frame signal and the downlink optical RF communications signals to be sent to the plurality of remote units.

8. The central unit of claim 1, further configured to receive a plurality of combined uplink RF communications signals and TDM uplink management frame signals over an uplink communications link from each of the plurality of remote units for the at least one RF communications service.

9. The central unit of claim 8, further comprising a splitter configured to split each of the plurality of combined uplink RF communications signals and TDM uplink management frame signals into a plurality of uplink RF communications signals and a plurality of TDM uplink management frame signals.

10. The central unit of claim 9, further configured to combine each of the plurality of uplink RF communications signals into a combined uplink RF communications signal, and to provide the combined uplink RF communications signal to at least one network.

11. The central unit of claim 9, further configured to combine each of the plurality of TDM uplink management frame signals into a combined TDM uplink management frame signal, and to demodulate the combined TDM uplink management frame signal to provide a combined demodulated TDM uplink management frame signal.

12. The central unit of claim 11, further comprising a transceiver configured to demodulate the combined TDM downlink management frame signal to provide the combined demodulated TDM uplink management frame signal.

13. The central unit of claim 12, further configured to translate the combined demodulated TDM uplink management frame signal into individual uplink management signals each originating from a remote unit among the plurality of remote units, the central unit further comprising a management services circuit configured to translate the combined demodulated TDM uplink management frame signal into individual uplink management signals each originating from a remote unit among the plurality of remote units.

14. A distributed antenna system comprising:
   at least one central unit comprising a media access controller in communication with a transceiver circuit, the central unit being configured to:

receive a plurality of downlink management signals from at least one management controller for distribution to a respective plurality of remote units;

time-division multiplex (TDM) the plurality of downlink management signals into time slots of the respective plurality of remote units to form a TDM downlink management frame signal;

receive downlink radio frequency (RF) communication signals of at least one RF communications frequency band for at least one RF communications service;

combine the TDM downlink management frame signal with the downlink RF communication signals; and send the combined TDM downlink management frame signal and the downlink RF communications signals to the plurality of remote units over a downlink communications link; and the plurality of remote units each configured to:

receive a plurality of uplink management signals from at least one client device;

time-division multiplex (TDM) the plurality of uplink management signals into individual time slots to form a TDM uplink management frame signal;

receive uplink RF communication signals of at least one RF communications frequency band for at least one RF communications service;

combine the TDM uplink management frame signal with the uplink RF communication signals; and send the combined TDM uplink management frame signal and the uplink RF communications signals to the at least one central unit over an uplink communications link, wherein the central unit is further configured to receive a plurality of combined uplink RF communications signals and TDM uplink management frame signals over an uplink communications link from each of the plurality of remote units for the at least one RF communications service, and wherein the central further comprises at least one optical-to-electrical converter configured to convert the plurality of combined uplink RF communications signals and TDM uplink management frame signals into a combined uplink optical RF communications signals and TDM uplink optical management frame signal.

15. The system of claim 14, wherein the central unit is further configured to modulate the TDM downlink management frame signal in a management services frequency band different from the at least one RF communications frequency band.

16. The system of claim 14, wherein the central unit further comprises at least one electrical-to-optical converter configured to convert the combined TDM downlink management frame signal and the downlink RF communication signals into a combined TDM downlink optical management frame signal and downlink optical RF communications signals.

17. The system of claim 14, wherein the remote unit is further configured to modulate the TDM uplink management frame signal in a management services frequency band different from the at least one RF communications frequency band.

18. A distributed antenna system comprising:

at least one central unit comprising a media access controller in communication with a transceiver circuit, the central unit being configured to:

receive a plurality of downlink management signals from at least one management controller for distribution to a respective plurality of remote units;

time-division multiplex (TDM) the plurality of downlink management signals into time slots of the respective plurality of remote units to form a TDM downlink management frame signal;

receive downlink radio frequency RF communication signals of at least one RF communications frequency band for at least one RF communications service;

combine the TDM downlink management frame signal with the downlink RF communication signals; and send the combined TDM downlink management frame signal and the downlink RF communications signals to the plurality of remote units over a downlink communications link; and the plurality of remote units each configured to:

receive a plurality of uplink management signals from at least one client device;

time-division multiplex (TDM) the plurality of uplink management signals into individual time slots to form a TDM uplink management frame signal;

receive uplink RF communication signals of at least one RF communications frequency band for at least one RF communications service;

combine the TDM uplink management frame signal with the uplink RF communication signals; and send the combined TDM uplink management frame signal and the uplink RF communications signals to the at least one central unit over an uplink communications link, wherein the remote unit further comprises at least one electrical-to-optical converter configured to convert the combined TDM uplink management frame signal and the uplink RF communications signals into a combined TDM uplink optical management frame signal and uplink optical RF communications signals, and wherein the remote unit is further configured to receive a plurality of combined downlink RF communications signals and TDM downlink management frame signals over a downlink communications link from the central unit for the at least one RF communications service.

* * * * *